United States Patent
Schachner et al.

(10) Patent No.: US 6,442,730 B1
(45) Date of Patent: *Aug. 27, 2002

(54) RECORDING MEDIUM FAILURE ANALYSIS APPARATUS AND METHOD

(75) Inventors: Joseph M. Schachner, Suffern; Lawrence S. Salant, New Hempstead; John Bradick, Goshen; David P. Max, New York, all of NY (US); Didier Jean-Daniel Lavanchy, Vaud (CH)

(73) Assignee: LeCroy Corporation, Chestnut Ridge, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/013,564

(22) Filed: Jan. 26, 1998

Related U.S. Application Data

(60) Provisional application No. 60/034,865, filed on Jan. 27, 1997.

(51) Int. Cl.⁷ .............................................. H03M 13/03
(52) U.S. Cl. ..................... 714/795; 714/794; 369/47.27
(58) Field of Search ...................... 714/795, 44, 47–48, 714/700, 794; 369/13; 702/66, 69; 386/95, 68, 81, 111, 98, 109, 124; 348/423.1; 360/32, 98.01

(56) References Cited

U.S. PATENT DOCUMENTS

| | | |
|---|---|---|
| 4,348,761 A | 9/1982 | Berger |
| 4,641,207 A | 2/1987 | Green et al. |
| 4,725,968 A | 2/1988 | Baldwin et al. |
| 4,794,599 A | 12/1988 | Purcell et al. |
| 5,068,754 A | 11/1991 | Garde |
| 5,073,834 A | * 12/1991 | Best et al. ................ 360/77.08 |
| 5,121,263 A | 6/1992 | Kerwin et al. |
| 5,123,016 A | 6/1992 | Müller et al. |
| 5,280,395 A | 1/1994 | Matsuzaki |
| 5,287,363 A | 2/1994 | Wolf et al. |
| 5,319,509 A | 6/1994 | Michelson et al. |
| 5,345,216 A | 9/1994 | Chopra et al. |
| 5,363,352 A | * 11/1994 | Tobita et al. ................ 369/13 |
| 5,414,713 A | 5/1995 | Waschura et al. |
| 5,422,890 A | 6/1995 | Klingsporn et al. |
| 5,432,801 A | 7/1995 | Hepler |

(List continued on next page.)

OTHER PUBLICATIONS

Automatic Analysis of Error Records in a Communication Controller for Optimum Maintenance; IBM Technical Disclosure Bulletin; Nov. 1988, US; NN8811138.*

*Primary Examiner*—Albert Decady
*Assistant Examiner*—Guy Lamarre
(74) *Attorney, Agent, or Firm*—Frommer Lawrence & Haug LLP; William S. Frommer; Gordon Kessler

(57) ABSTRACT

A technique for analyzing a signal received from a recording medium. An input signal is received from the recording medium and analyzed in order to determine the location of errors within the input signal. The portion of the input signal determined to have an error is displayed. The analysis technique is selected from the group consisting of comparing the input signal with a reference signal, comparing a confidence factor indicative of the ease with which an apparatus that performs a channel emulation is able to select between alternate results for a portion of the input signal with a confidence factor indicative of the ease with which the apparatus that performs a channel emulation is able to select between alternate results of a portion of a reference signal, comparing the confidence factor indicative of the ease with which the apparatus that performs a channel emulation is able to select between alternate results of a portion of said input signal with a predetermined threshold, and comparing a Non Return to Zero (NRZ) component of the input signal with a stored NRZ signal.

76 Claims, 18 Drawing Sheets

U.S. PATENT DOCUMENTS 5,453,885 A * 9/1995 Takeshita et al. .............. 386/91
5,465,374 A * 11/1995 Dinkjian et al. ............ 711/219
5,471,351 A   11/1995 Ishiguro
5,490,091 A * 2/1996 Kogan et al. ................ 702/108
5,654,841 A   8/1997 Hobson et al.
6,112,160 A * 8/2000 Salant et al. ................... 702/66

* cited by examiner

| DENSITY OF SAMPLES PER PW50 | |
|---|---|
| PEAK DETECT | 1 |
| PRML | |
| PR4 | 1.65 |
| EPR4 | 2 |
| E2PR4 | 2.31 |

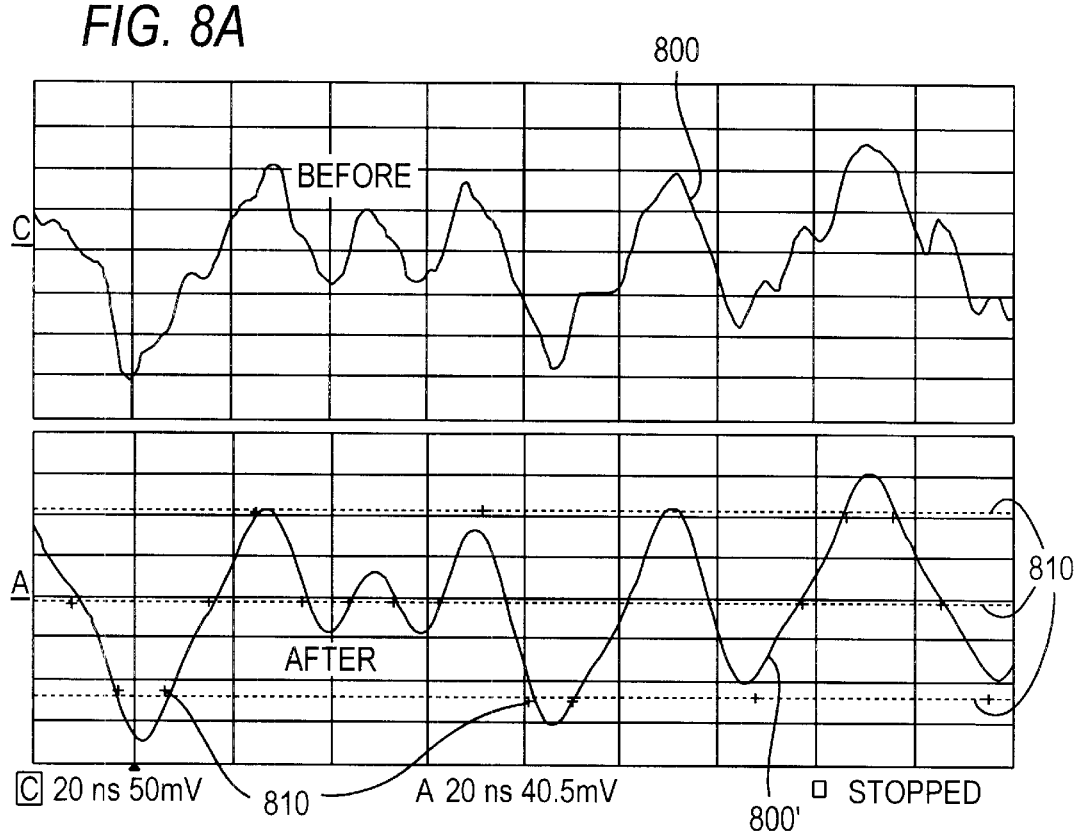

| BLOCK- | RCLK# | REF. ADDR | REF. DATA | NRZ. ADDR | NRZ. DATA |
|---|---|---|---|---|---|
| 0- | 81 | 52 | 1 | 52 | 0 * |
| 0- | 82 | 53 | 0 | 53 | 0 |
| 0- | 83 | 54 | 1 | 54 | 1 |
| 0- | 84 | 55 | 1 | 55 | 1 |
| 0- | 85 | 56 | 1 | 56 | 1 |
| 0- | 86 | 57 | 1 | 57 | 1 |
| 0- | 87 | 58 | 1 | 58 | 1 |

*FIG. 12*

RECORDING MEDIUM FAILURE ANALYSIS APPARATUS AND METHOD

This application claims the benefit of U.S. Provisional Application No. 60/034,865, filed Jan. 27, 1997.

BACKGROUND OF THE INVENTION

This invention relates generally to a method and apparatus for analyzing a disk drive, and more particularly to a method and apparatus for determining the location and severity of errors on a disk drive or other appropriate recording medium.

Traditionally, in order to determine whether an error is present on a disk drive, it was necessary for an oscilloscope to be connected to the recording medium, and for a signal to be read from the recording medium. A technician manually scrolled through the signal depicted on the oscilloscope for the entire recording medium and visually reviewed the signal, looking for portions of the waveform that did not follow a regular, predictable pattern, to determine if there were any errors. Thus, by way of example, a technician might look at a signal output from a disk drive in order to insure that each of the waveforms has a similar amplitude within a certain tolerance. This method may be most easily used when recording media are encoded using a format known as "peak-detect" in which a technician must confirm that the peaks of all waveforms have consistent amplitude. As is evident, this analysis can be very time consuming since the technician must look at each waveform of the signals reproduced from the entire medium to detect an error. Also it is very difficult for a technician to detect all errors on the recording medium because of the volume of data and subtleness of the error detection.

Recently, drive-encoding format has changed from a peak-detect format to a PRML format. PRML format allows a signal to be checked at various points therealong, and not merely at the peak amplitude position, and thus allows more efficient encoding schemes. In accordance with various PRML formats, there may be anywhere from three to nine or more checkpoints or possible amplitude levels that indicate different data within a signal waveform. With the transition of drive technology from peak-detect to PRML format, interpretation of signal quality through visual analysis of the head signal (i.e., the signal reproduced from the recording medium) has become much more difficult. Whereas peak-detect signals could be analyzed by visual inspection of the location, quality and amplitude of peaks, analysis of PRML signals is much more difficult because of the complexity of PRML wave shapes and because the determination of whether a signal is "bad" or "good" is based on sophisticated processing of the head signal.

For this reason, it is very difficult to manually check a disk drive for errors. Therefore, it would be beneficial to provide an automated disk analysis apparatus and method that determine errors on a disk drive without the need for manual review of the reproduced signal from the entire medium.

OBJECTS OF THE INVENTION

Accordingly, it is an object of the invention to provide an improved, automated disk drive failure analysis apparatus and method.

Another object of the invention is to provide an improved automated disk drive analysis apparatus and method which allows a user to automatically analyze a PRML signal received from a disk drive to determine the location of any errors contained therein.

A further object of the invention is to provide an improved automated disk drive analysis apparatus and method in which the PRML signal can be analyzed at any point in the disk drive from the pre-amp stage through output channel.

Yet another object of the invention is to provide an improved automated disk drive analysis apparatus and method which automatically and rapidly finds errors in the head recording signal by determining errors in the Non Return to Zero (NRZ) signal.

A still further object of the invention is to provide an improved automated disk drive analysis apparatus and method which allows a user to view the head signals determined to have errors along with ideal sample values.

Still another object of the invention is to provide an improved automated disk drive analysis apparatus and method which displays the byte offset indicative of the location of a particular error, or allows a user to view a portion of the output head signal at a particular desired byte offset.

Still other objects and advantages of the invention will in part be obvious and will in part be apparent from the specification and drawings.

SUMMARY OF THE INVENTION

Generally speaking, in accordance with the invention, an improved automated disk drive analysis apparatus and method are provided for automatically determining, finding and displaying errors present in the generated head signal of a disk drive. Thus, this improved apparatus and method of the invention improve the user's ability to:

Analyze PRML signals from the pre-amp through the output channel;

Rapidly find the location of errors on the head or NRZ signals;

View the head signal after equalization (Disk Drive Filter emulation);

Visually compare the equalized head signal to ideal samples values;

Determine the margin available to the Viterbi detector;

View the NRZ data, the corresponding sample values, Viterbi margin, equalized head signal and the direct head signal; and Analyze the head signal directly.

For the remarkable gains in disk drive capacity to continue, media and head performance improvements are no longer enough. Faced with equally impressive advances in semiconductor technology, disk drive engineers have been working to create a new read-channel architecture that will allow capacity to grow unimpeded.

The answer lies in the construction of the disk itself. The disk's magnetic poles, with two orientations possible along the track, store the bits as "0" and "1".

When the drive is used in a read operation, the head detects the transition from one pole to another—as bit "1" to bit "1", for instance. If such transitions are far apart, or low-density, the drive will see isolated pulses. But for greater density, the pulses can either be made shorter, and therefore be placed closer together, or kept wide (longer) but allowed to overlap, and therefore need not return to zero between each pulse.

While the first of these alternatives, represented by Peak Detect systems, is believed to have reached its limits, the second-Partial-Response, Maximum Likelihood (PRML)—is currently seen as the best way to continue to boost capacity. However, additional channel types having superior characteristics, including a number of different algorithms and methods of analyzation, such as Decision Feedback Equalization (DFE), have been proposed, and are currently being developed. While the PRML channel is employed in a preferred embodiment of the invention, the invention is equally applicable to DFE, or any other channel types, which may be employed recording data on a recording medium.

The overlapping pulses of partial-response systems allow much greater density than the shorter isolated pulses of a peak detect system. PRML systems have more samples per "pw50", which is defined as the width of an isolated pulse at 50% of its amplitude. The more complex, or higher-order, the PRML system, the greater the density that can be obtained. As is shown FIG. 1, comparing typical values achieved by available PRML systems with the values achieved by Peak Detect systems, it will be observed that the PRML values allow far denser, and therefore faster and more efficient, encoding schemes, such as E2PR4. PRML encoding schemes may have a density of 2.31 times that of a peak detect encoding scheme. However, the higher-order PRML schemes need very complex circuits and decoders. While the PR4 system works with three vertical levels of samples (encoding levels which must be differentiated), E2PR4 has seven vertical levels which must be differentiated and therefore requires not only a higher resolution of ADC, but a complicated timing and gain recovery circuit and sophisticated Maximum Likelihood detector as well.

Another disadvantage of the more complex PRML schemes is that they are more sensitive to noise.

The process of taking the more-or-less Lorentzian-shaped head response to a magnetic transition and turning it into a correctly shaped pulse is called equalization. This is important due to the need of the Viterbi detector inside the PRML channel chip to receive and analyze correctly shaped pulses. Essentially, equalization is performed in the read channel chip by a Continuous Time Analog Filter (CTAF).

Since a received head signal to be analyzed is typically noisy, and contains pulses which are not quite the desired shape, the DDFA apparatus constructed in accordance with the invention provides an equalization filter to reduce much of the noise and reshape the pulses before it processes and analyzes the waveform. Noise must be eliminated before the sampling occurs, or else it becomes quite difficult to separate noise from the signal desired to be tested. In accordance with a preferred embodiment of the invention, the filter is a digital implementation of a seven-pole, two-zero equiripple filter. This filter may be automatically tuned, or the parameters may each be set manually, as will be described below.

The "goodness" of a head signal in a PRML drive is ultimately determined by whether the values a Viterbi detector can identify from the head signal through processing are correct. Thus, to test a PRML signal the apparatus must test the data after it has been converted into a digital signal. Since in prior art devices the user typically can only view the preamp head signal on a standard oscilloscope, much of the information the user would require to analyze a PRML signal is not available.

The Viterbi detector is a state machine consisting of two distinct parts, state and transition.

While state is the current magnetization of the disk and some history (memorization of the latest states), transition relates to the change from the current state to the next state. For the Viterbi detector, only two possibilities exist: either the state (medium magnetization) is the same between the current and the next bit periods, or it is not. The detector's trellis is a mechanism that keeps track of a sequence of magnetization states. The trellis works according to this dichotomy—"0" or "1" is followed by either a "0" or a "1", and so on. When the ML detector makes decisions, the trellis keeps the states of several consecutive time instants and estimates the likelihood of possible "histories" (higher probability). The higher the order of the PRML system, the larger and more complex the trellis. However, some trellises do not allow certain transitions (d=1 constraint), thereby limiting the extent to which the pulses can overlap.

While a threshold detector, such as the peak detector on a Peak Detect drive, does not use the previous and subsequent samples, a ML (Maximum Likelihood) detector, such as a Viterbi detector, does use historical samples, and thus, by way of example, does not allow "111" as a determined sequence, since it is a forbidden sequence of samples. Thus, the detector tries to determine the most probable data pattern for this sequence of samples (21 samples used for PR4).

Proposing several close allowable sequences—{1 0–1 0 1 1 0 0} or {1 0–1 0 0 1 1 0} or {1 0 –1 0 0 0 1 1}—is easy. But the decision of which is most probable is made based on a sequence of samples, instead of only a single, current sample, and the sequence with the minimum distance (maximum likelihood) is selected as the detection result.

Sequence Amplitude Margin (SAM) is a measure of this minimum distance, and is determined by measuring the error margin or confidence factor of every sample taken by a PRML channel chip by the Viterbi detector and determining an average. Determining that a written bit is either a "1" or a "0" is the disk drive's most basic decision. SAM measures the margin by which the Viterbi detector was able to make this decision, the margin or distance being a function of the path metrics and current sample taken together. SAM can provide a prediction of the error rate, and can be used both for characterization and for optimizing equalization. Lower SAM values mean better error rates. Other metrics, such as mean square distance, or the like, which predict error rates in a similar manner may also be used in place of SAM.

The range of SAM values depends on the PRML order (21 for PR4), as does the path metrics, memory or sequence. The range is 0 to –1.41 (the negative sign is a convention) for a PR4 channel. The "0" in this case signifies that the drive had no margin to make the decision, that it could have read every single bit incorrectly. The –1.41 signifies that the drive had as much margin as it could and will never make an error.

FIG. 2 illustrates an exemplary distribution of SAM values taken with three different PR4 drives. The drive represented by curve A to the right in the figure has a distribution of around 0.3 and is a "bad" drive. The drive represented by curve B has a distribution of around 0.9 and is an "OK" drive. The drive represented by curve C has a distribution of around 1.2 and is a "good" drive.

The apparatus and method of the invention greatly improve one's ability to analyze the head signal by utilizing the SAM, in accordance with the results of the Viterbi detector to determine the quality of even the most complex of signals. Thus, by emulating a drive channel to the Viterbi level of operation, the user can now have a PRML signal of any order automatically analyzed in order to more accurately determine if errors exist in the signal. The result of providing these capabilities is that the analysis of PRML signals on oscilloscopes is much easier to interpret, much more accurate, much faster and much more intuitive.

The apparatus and method of the invention also provide users not only the ability to determine the overall quality of a disk drive signal, but also the ability to find the actual location of errors in a signal from a disk drive much more rapidly, and to automatically view these errors. Previously, determining where an error occurred in a PRML head signal was very time consuming, difficult and error prone, requiring scrolling through the signal while manually searching for errors. With the apparatus and method of the invention, finding errors is virtually automatic. In accordance with the invention, five different error finding methods and analysis tools are provided for rapidly finding the location of errors in a disk drive signal. These methods are identified as: Head Analog Compare; ML Distance; ML Compare; NRZ Compare; and Byte Offset. Which method is most appropriate to use depends on the information available to the user.

By definition, a data error occurs in a disk drive when a bit is interpreted as a "1" when it should be a "0" or vice-versa. It is generally desirable to examine the head signal at the location(s) where data errors occur to gain insight into the cause of the error. The Disk Drive Failure Analysis (DDFA) method and apparatus of the invention provide the tools to help identify the exact or likely location of a data error. In addition, with the channel emulation capability of the DDFA apparatus, the user is able to gain further insight into the cause of an error(s) once its location is determined.

Each of these five Disk Drive Failure Analysis error finding methods analyzes a user selected region of a head signal or an NRZ data signal to determine where errors occur, or are most likely to have occurred (i.e., where the signal was incorrectly interpreted, or where the confidence in the interpretation was low). Once a method is selected, a Find Error function is activated by the user, and the apparatus in accordance with the invention continues to acquire data from the disk drive output signal being tested until one or more errors are found. The user then selects which error he or she wishes to view (if multiple errors are found). As an error is selected to be viewed, the corresponding byte offset location of where the error occurs in the head signal is displayed by the apparatus.

The Head/Analog Compare method compares two signals and identifies where they differ beyond a selected threshold. With this method the user selects a head signal that will be used as the reference signal and stores this reference signal to memory, and then provides an input signal to be tested. The user selects the predetermined maximum allowable difference between the two signals. The apparatus is designed to automatically align the two signals, and identify where a mismatch between the two signals occurs. The apparatus also counts each error and stores its byte-offset location for further review. The errors then may preferably be identified, stored and reviewed in largest to smallest order. As a general-purpose test method, Head/Analog Compare can be applied to finding errors in practically any signal, including VCO synchronization fields, data and servo-information. FIG. 3 depicts the visual output of the invention after performing an exemplary Head/Analog Compare analysis.

The Maximum Likelihood (ML) Distance method acquires a single trace signal from a disk drive and predicts the bit or bits where the disk drive is most likely to create an error. This method uses a full disk drive channel emulation to indicate head signal areas with lower quality. It measures the Sequence Amplitude Margin (SAM), i.e. the distance or margin the Viterbi detector has for making a decision, of all the samples (PRML clock locations). If the SAM is less than a predetermined user-selected value, the head signal location is considered to be an error. The apparatus of the invention emulates a PRML channel and ranks errors by SAM value. A distance or SAM value of "0" indicates no margin for a decision and the detector's lack of certainty as to whether the digital bit should be "1" or "0". Preferably, the 100 worst margins on the detector output are displayed along with the SAM value of each. FIG. 4 depicts the visual output of the invention after performing an exemplary ML Distance analysis.

The Maximum Likelihood (ML) Compare method calculates the Viterbi output of a reference signal as well as that of an acquired trace signal, and compares the two to find mismatches, whereas ML Distance (noted above) acquires a single trace and makes an error prediction. Thus, rather than comparing the Viterbi analysis of an input trace signal to a channel emulation, in an ML Compare analysis the results of a Viterbi analysis of the input signal are compared to the results of the Viterbi analysis of the reference signal, and errors are indicated when the results of the Viterbi analyses fail to match. FIG. 5 depicts the visual output of the invention after performing an exemplary ML Compare analysis.

The NRZ Compare method compares the actual NRZ digital data stream received from the disk drive to a reference set of digital data and determines where they disagree. The user can view the data sequences where the digital data from the two sources differ and the apparatus will automatically show the corresponding section on the analog head signal for each error selected. FIG. 11 depicts the visual output of the invention after performing an exemplary NRZ Compare analysis. The apparatus constructed in accordance with the invention further includes a special logic probe for use with the NRZ Compare method. Preferably, the probe may connect as many as 12 NRZ data lines, read clock and control signals to the apparatus of the invention, and stores a non-return to zero reference to which subsequent NRZ acquisitions are compared. Sensing a data error, the probe triggers the oscilloscope to zoom in on the analog waveform corresponding to the location of the data error.

The Byte Offset Position method enables a user to retrieve the byte location of an error and see precisely what kind of error it is, instead of spending time on calculations and delay changes, if the user already knows the location of the error. The user can return repeatedly to find the byte as an offset from the first user data byte after the beginning of the selected data segment.

Thus, in accordance with the invention, a signal from a disk drive may be automatically analyzed by choosing a technique which is consistent with the data which the user is able to obtain. The analysis takes place, and the errors detected by the apparatus are displayed so that the user may review these errors. Thus, in accordance with the apparatus and method of the invention, the detection of an error in a signal output from a disk drive is simplified and is made more accurate.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is made to the following description and accompanying drawings, in which:

FIGS. 8A and 8B depict a head signal before and after filtering, respectively;

FIG. 12 depicts a comparison of NRZ data;

DETAILED DESCRIPTION OF THE PREFERRED EMBODIMENTS

Figure 6A:
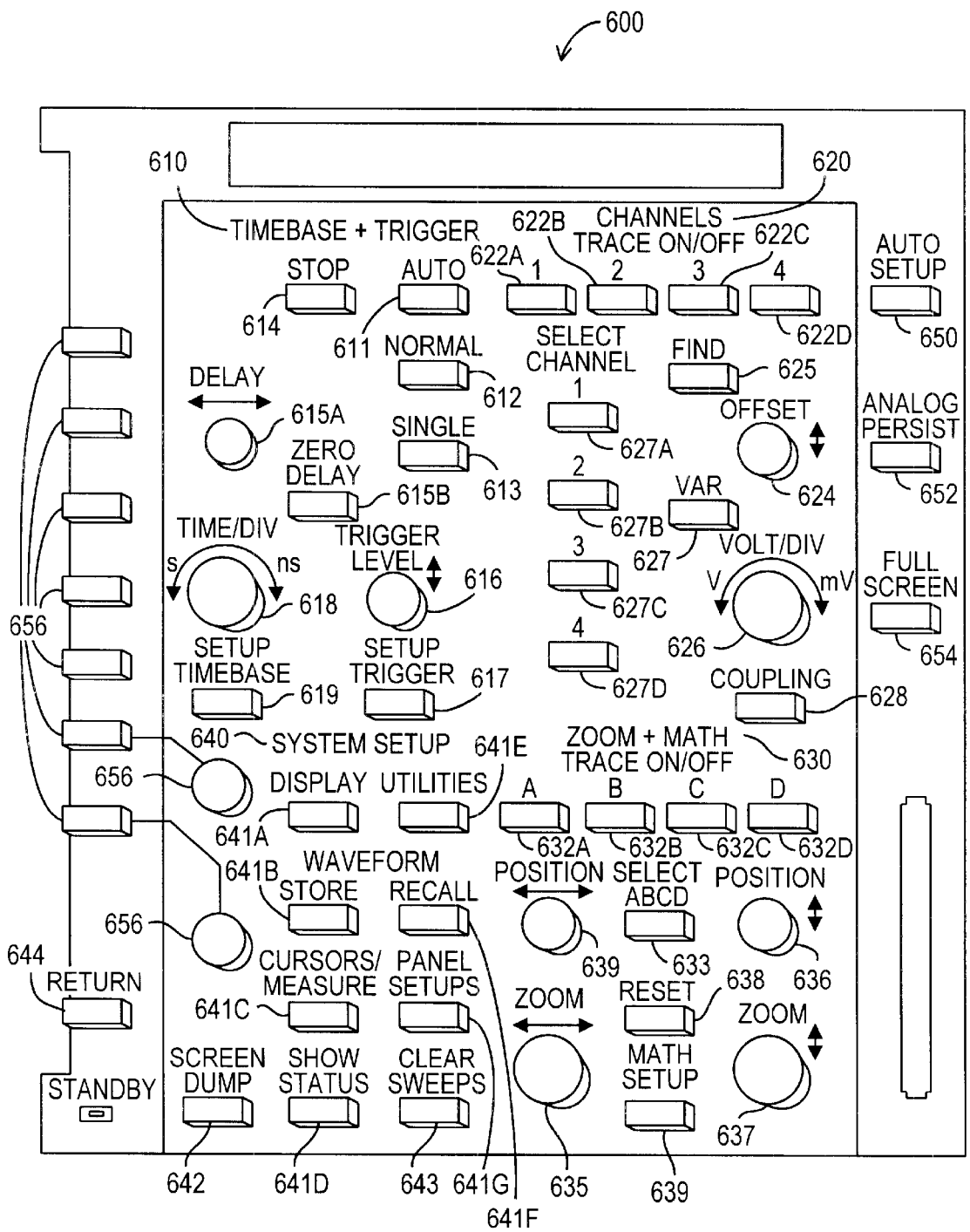
FIGS. 6A and 6B depict a DDFA apparatus constructed in accordance with the invention.
Figure 6B:
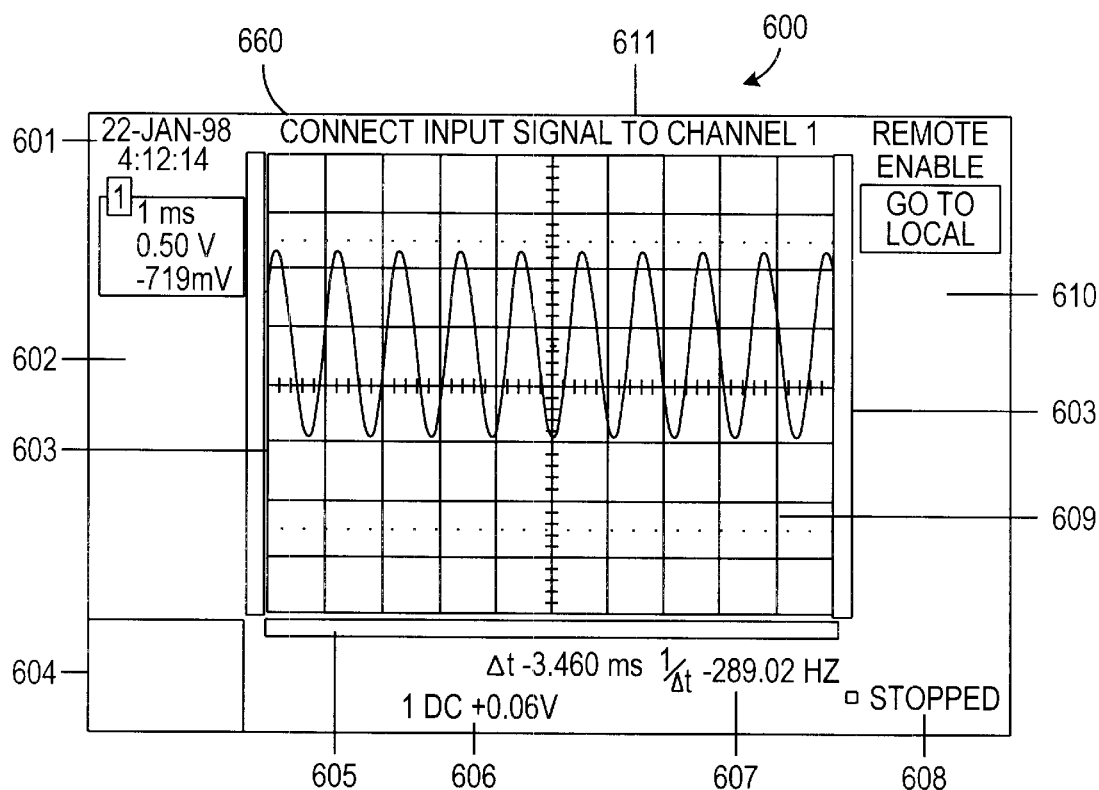

Reference is first made to FIGS. 6A and 6B which depict a disk drive failure analysis apparatus 600 constructed in accordance with the invention. FIG. 6A depicts the front panel control portion of disk failure analysis apparatus 600, while FIG. 6B depicts the screen portion of disk drive failure analysis apparatus 600.

As is shown in FIG. 6A, the front panel control of disk drive failure analysis apparatus 600 is divided into four main portions: time base+trigger portion 610, channels portion 620, zoom+math portion 630 and system setup portion 640. An auto setup button 650, an analog persist button 652, and a full screen button 654 are positioned along the right side edge of the front panel portion of disk drive failure analysis apparatus 600 in FIG. 6A. Additionally, along the left edge of the front panel portion are provided a plurality of menu buttons and knobs 656 and a menu return button 644 which allow a user to navigate through various menus which may be presented on the screen portion of disk drive failure analysis apparatus 600, depicted in FIG. 6B (explained below).

Channels portion 620 allows a user to select and enable the display or use of signals being input on various input channels. Specifically, each of trace on/off buttons 622A–622D can be switched on or off in order to input a corresponding signal on a corresponding input channel into disk drive failure analysis apparatus 600; and select channel buttons 627A–627D allow for the manipulation of any of the traces which are switched on. When a channel is selected by switching on the corresponding select channel button 627A–627D, offset control 624 and volts/div control 626 will operate to effect the display of the signal received from the active selected channel.

Offset dial 624 changes the vertical position of the active channel being displayed on the screen. A find button 625 is operable to automatically adjust the offset and volts/div of a signal to match the attributes of the input signal from the active channel. Volts/div dial 626 sets the vertical sensitivity factor of the signal in the display screen, thereby changing the visual gain in the screen. Operation of a var button 627 chooses between two modes: in the first mode volt/div dial 626 operates in a step mode, and in the second mode volts/div dial 626 operates in a continuously changing mode. Finally, a coupling button 628 is provided which allows a user to access the menus that are displayed on the screen portion of disk drive failure analysis apparatus 600.

Time base+trigger portion 610 includes three mode buttons: auto button 611, normal button 612 and single button 613. Normal mode button 612 operates to place the apparatus in a normal mode, in which the display screen is continuously updated as long as a valid trigger (timing indicator to acquire a new portion of an input signal), indicating that the signal should be sampled, is present. If a valid trigger is not present, an error message is displayed which indicates that the trigger is slow. Auto mode button 611 operates to place the apparatus in an auto mode. This mode is similar to the normal mode, however the signal is displayed even if no trigger occurs once a short, predetermined period of time has elapsed. Single mode button 613 operates to place the apparatus in a single mode where the apparatus waits for a single trigger to occur, acquires and displays a single segment of the signal and stops acquiring additional signals. Each of the normal, auto and single modes allows a user to view a received signal in different time periods, one being continuous, one waiting for specific triggers, and one stopping at the end of each acquired segment. A stop button 614 prevents the apparatus from acquiring any new waveforms, regardless of which mode it currently is in.

A delay knob 615A allows for a timing delay between the time a trigger is applied and the time acquisition of a signal actually begins. A zero delay button 615B is operable to reset this delay to zero. A trigger level 616 sets the trigger threshold value and may be utilized in conjunction with a setup trigger button 617 which operates to access a menu on the display screen of the apparatus to set up the various trigger values. A time/div dial 618 defines the time per division displayed on the display screen, and a setup time base button 619 operates to access a setup time base menu on the display screen for setting various parameters regarding the time display of the screen.

System setup portion 640 establishes the setup of the apparatus. The system setup portion includes a plurality of menu choice buttons 641A–641G that allow for the selection of various menus to be displayed on the display screen portion of the apparatus. A display menu selection button 641A is operable to gain entry to the display setup menus controlling the display mode, grids, intensities, dot joining, colors and persistence menus. A waveform store menu button 641B operates to access the store waveform menus for storing waveforms to internal or external memory. A cursors/measure memory button 641C operates to access the cursor setup menus for precise cursor measurements on displayed signal traces, and the measure menus for precise parameter measurements. A show status menu button 641D operates to access a status menu that shows a summary of the instrument status regarding acquisition of new signals, system settings, etc. A utilities menu button 641E operates to access the utilities menu for controlling hard copy setups, various addresses and special modes of operation. A waveform recall menu button 641F operates to access the recall waveform menus for retrieving waveforms stored in internal or external memory. A panel setups menu button 641G operates to access the panel setups menus for saving and recalling various stored configurations of the apparatus.

Operation of the menus will be described below as necessary in connection with further description of the various find error methods.

In addition, system setup section 640 is provided with a screen dump button 642 which is operable to print or plot the contents of the screen display onto an online hard copy device. A clear sweeps button 643 operates to reset various memories so that operations requiring the use of multiple acquired signals, such as various averaging functions and the like, are reset.

Zoom+math section 630 is provided with four trace on/off buttons 632A, 632B, 632C and 632D. Each of these buttons allows a user to select signals or portions of signals that will be zoomed in on the display screen of the apparatus. When a particular trace is turned on, the other zoom control buttons and knobs operate to control it. A select ABCD button 633 is operable to switch consecutively from one signal trace to the other traces. A position knob 634 allows for a change in position in the horizontal direction of a trace which is zoomed in, while position knob 636 allows for a similar change of position in the vertical direction. A zoom knob 635 allows for the expansion or contraction of a zoomed in signal in the horizontal direction while a zoom knob 637 allows for similar expansion or contraction in the vertical direction. Finally, a math setup button 639 allows a user to enter a math setup menu, which includes features such as averaging, cumulative tallies and the like.

The front panel display of disk drive analysis apparatus 600 also includes auto setup button 650, analog persist button 652 and full screen button 654, as noted above. Auto setup button 650 is operable to set various features of the apparatus to a standard, predetermined level for normal viewing and use. Analog persist button 652 is operable by the user to enter a special mode, whereby an analog oscilloscope view of the signals is provided, but the data manipulation features of a digital oscilloscope are maintained. This feature allows a user to rapidly accumulate multiple waveforms into three-dimensional display maps, and to perform various functions associated therewith. Finally, full screen button 654 is operable to expand the viewed waveform and grid to fill the entire display area of the apparatus.

Reference is next made to FIG. 6B, which depicts the display and screen portion 660 of the disk drive failure analysis apparatus 600. Display and screen portion 660 displays various input and output generated waveforms, as well as menus for controlling the operation of the apparatus, and various other data, allowing the user to view other data regarding the operation and parameter settings of the apparatus. A real time clock field 601 is provided that depicts the date and time. A displayed trace label field 602 indicates the trace signal that is currently displayed, its time/div settings and cursor readings when applicable. Trigger level field 603 consists of small arrows on either side of the display indicating the trigger setting level. An acquisition summary field 604 contains timebase settings, vertical gain, probe attenuation and coupling for each channel. A trigger delay field 605 depicts the trigger delay, that is, the time after a trigger the apparatus waits before analyzing the data, with an arrow along the bottom of the display indicating the number of grid divisions of the delay. A trigger configuration field 606 displays the trigger source, slope, level and coupling, and additional information regarding the trigger, where applicable. A time and frequency field 607 displays the time between set points and the frequency of the displayed waveform. A trigger status field 608 indicates which of normal mode, auto mode, single mode or stop mode the trigger is operating in, and various error messages as needed associated with each of the trigger modes. A grid and screen 609 displays the signals from the input channels or from memory. A menu field 610 displays the various menus which may be chosen by the use of menu selection buttons 641A–641G and math setup button 639 (FIG. 6A). Buttons and knobs 656 and return button 644 operate to move through various menu choices. By depressing appropriate buttons, a user may access the various choices within the chosen menus. Return button 644 may also be used in connection with several of the menu functions. When the return button is depressed, the apparatus invokes one higher level menu, or, if in the highest level menu, exits the menu function. Finally, a message field 611 conveys messages to the user.

The DDFA apparatus includes a number of different find error methods for use in determining errors in an input signal. While each find error method comprises a different embodiment of the invention, a preferred embodiment includes all of the find error methods, letting the operator select the find error method that will be employed.

While the apparatus and method in accordance with the invention are rich in capability for determining the location of errors in a disk drive signal, the general steps used in employing DDFA of the invention are fairly simple and include:

1) Selecting a Find Error Method. The specific configuration requirements depend upon the find error method selected.
2) Setting up the Required Input Signals. Each of the find error methods has a preferred set of signals to be supplied to the apparatus.
3) Identifying the Signals the user is providing. The signals and their source, which may be a particular input channel or memory, are identified. In addition, the user should identify the section of signal that is to be analyzed.
4) Identifying the characteristics of the head signal. Each of the find error methods has a preferred set of head signal characteristics that should be identified in order to perform the necessary analysis. These characteristics include bit cell time, code rate, channel type, including Peak Detect or PRML, and other characteristics.
5) Establishing how the error analysis results should be presented. There are several display options for configuring additional information to provide on the display that may be helpful in analyzing errors. The user may select these options prior to or after errors are located.
6) Turning on "Find Error" Once the DDFA apparatus is properly configured, the find error mode is activated and the apparatus continually acquires new signal inputs and analyzes each input according to the selected method until an error(s) is found.
7) Review Identified Errors When errors are identified, the number of such error is displayed. The user can easily select which error is to be reviewed and the corresponding head signal location is presented at the center of the display. If the user has selected one of the find error methods that uses a specified threshold (ML Distance or Analog Compare), the threshold is adjusted until some errors are identified.

The purpose of each of the DDFA find error methods of the invention is to find signal quality errors in an analog head signal from a disk drive.

Thus, when setting up the apparatus to perform a DDFA find error, the user determines which signals to provide to the oscilloscope, the waveform section(s) to be analyzed, the reference waveform, and the trigger and time/div settings. If the NRZ find error method is not being used, the head signal from the disk drive is the only signal the DDFA apparatus requires.

All of the find error methods require that the user specify which channel or memory of the oscilloscope contains the analog head signal. The analog head signal may be either the signal from the pre-amplifier of the disk drive, or from the drive filter of the disk drive, if available. The DDFA apparatus may automatically determine which portions of the signal will be analyzed by optional use of a read gate function in analyzing the signal. The read gate signal is optional, but preferred for all find error methods. The NRZ compare method requires a read gate.

Figure 7:
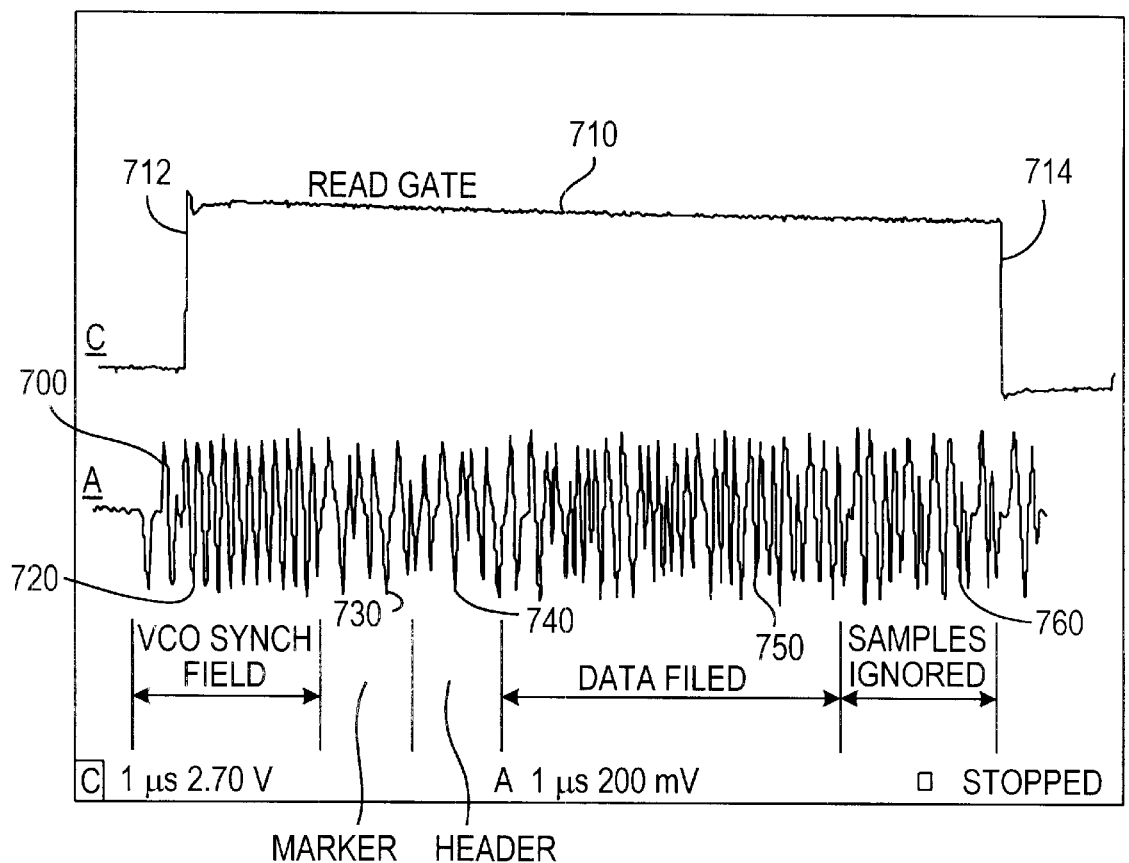
FIG. 7 depicts a head signal and read gate with portions thereof labeled.

In FIG. 7, the fields of a head signal 700 and their relationship to a read gate signal 710 are shown. In all of the find error methods, a repetitive signal referred to as a VCO Synch signal 720 within head signal 700 is attempted to be identified so that the portion of head signal 700 that is being analyzed can be confirmed, and so that a channel emulation can be properly generated. VCO Synch signal 720 is also used to adjust the phase of a PLL (phase locked loop) which generates a sampling clock, and to adjust an AGC (automatic gain control) circuit (discussed below). In order to identify the repetitive VCO Synch signal a read gate signal 710 may be provided. In a normally operating disk drive, every time the read gate signal goes true (at the beginning of every segment to be read, indicated at 712) VCO Synch signal 720 is present. Thus, the position of VCO Synch signal 720 will be identified.

After VCO Synch signal 720 is analyzed, a marker 730 designates the end thereof. After identifying marker 730, the DDFA apparatus is ready to analyze a header information field 740 and a Data Field 750 for errors. Since these portions of head signal 700 generally do not start immediately after the end of the VCO Synch signal 720 and marker 730, the DDFA apparatus needs to know where the fields to be analyzed start. The user specifies the number of bytes between the VCO Synch signal 720 and header field 740 and Data Field 750. After receiving this information regarding the location or beginning of header field 740 and Data Field 750, the location of the first byte of data to be analyzed is then determined by the DDFA apparatus.

Often, there is a delay between the end of valid data and the disabling of the read gate. It is generally not meaningful to analyze this area of a sector for errors. In order to avoid analyzing this area, the user specifies an additional amount of "garbage data" at the end of data field 750 which will not be analyzed. This "garbage data" between the end of valid data and the termination of the read gate defines a samples ignored portion 760 of head signal 700 that is not analyzed by the DDFA apparatus. Additionally, while the read gate signal is indicated as being true in section 710 which is at a relatively high level, the polarity of the signal may be adjusted so that the read gate is true at a relatively low or even negative level. This is useful to meet the format of a particular disk drive of inverse polarity.

If a read gate signal is not available, analyze region (region start and end) markers may be set by the user. These analyze region markers specify the outer most boundaries of the data to be analyzed. Additionally, these analyze region markers may be used in conjunction with a read gate signal to analyze a subset of several read gate true sections, or only a portion of a single read gate true section. For example, a user may want to exclude an ID portion of data field 750, or other portion thereof.

Figure 9A:
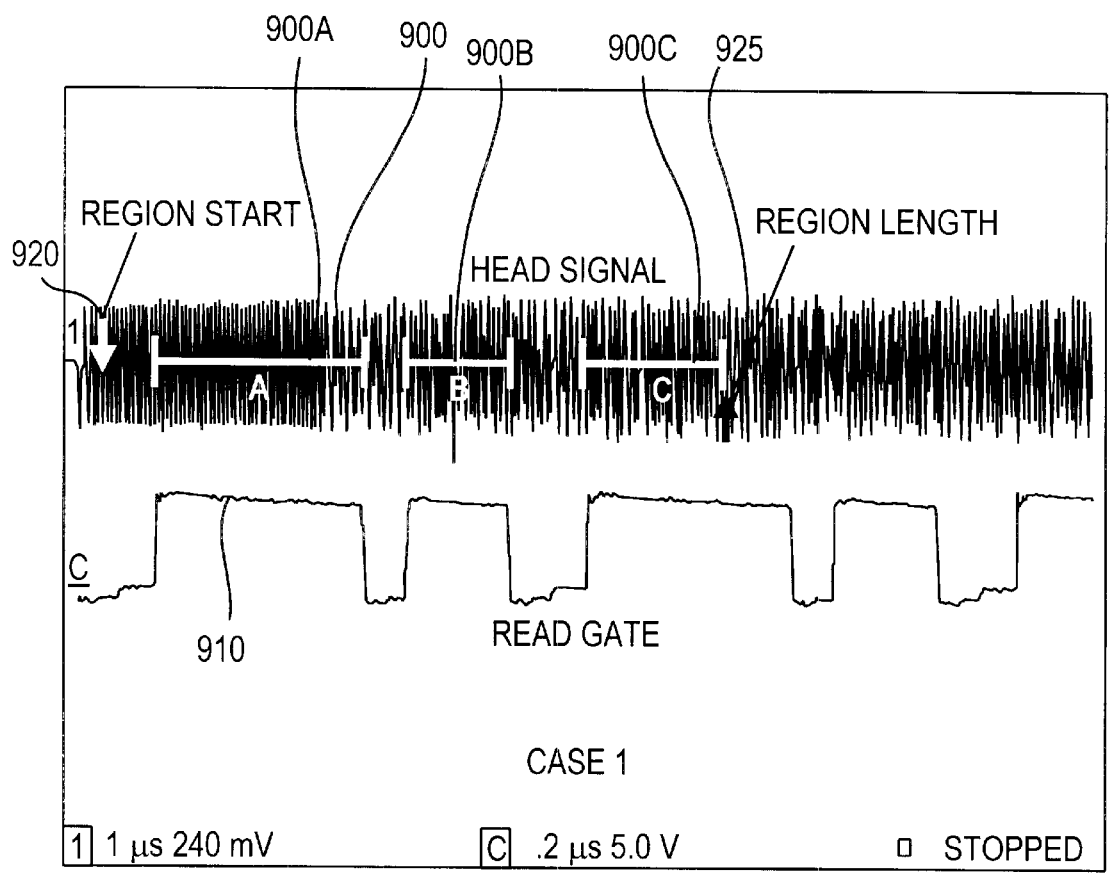
FIGS. 9A–9D depict various combinations of Read Gate and region markers in accordance with the invention.

FIGS. 9A–9D depict areas of the waveform to be analyzed with different combinations of the cursors and/or with the read gate signal enabled. As shown in FIG. 9A, a signal 900 is delineated by region start and end markers 920 and 925, respectively. Within the area designated by markers 920 and 925, if the read gate signal is specified, as shown at 910, only the regions 900A, 900B and 900C of head signal 900 (i.e. those regions during which read gate signal 910 is true) are analyzed. All other areas of the head signal are ignored.

Figure 9B:
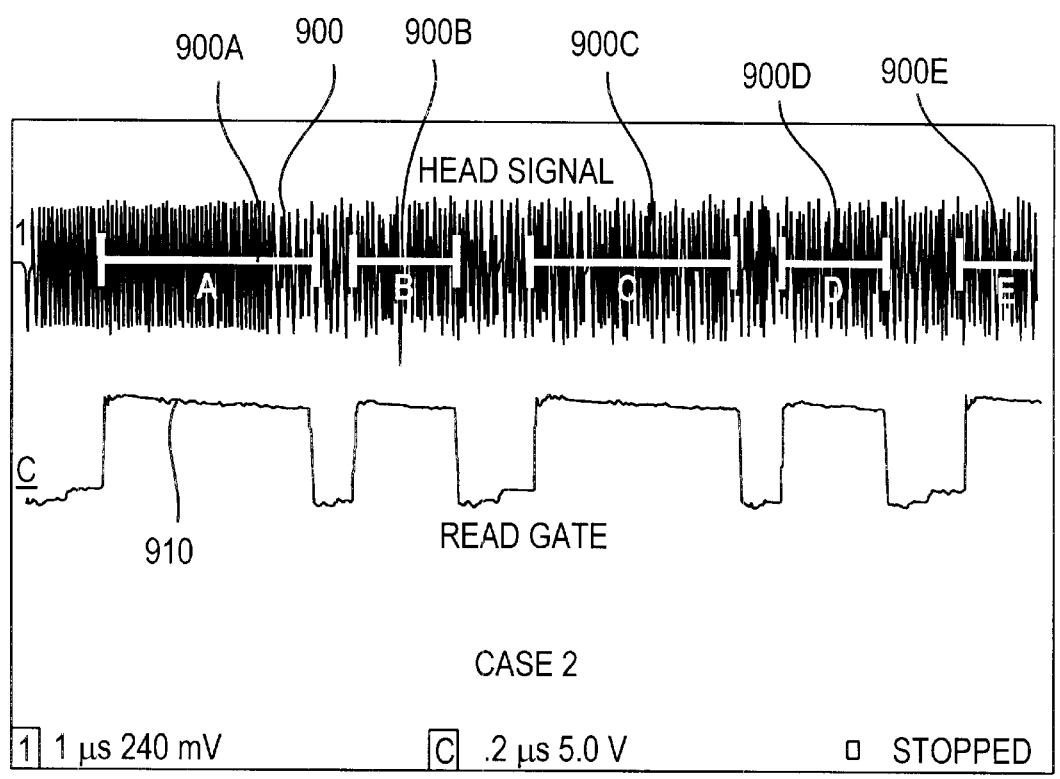
Figure 9C:
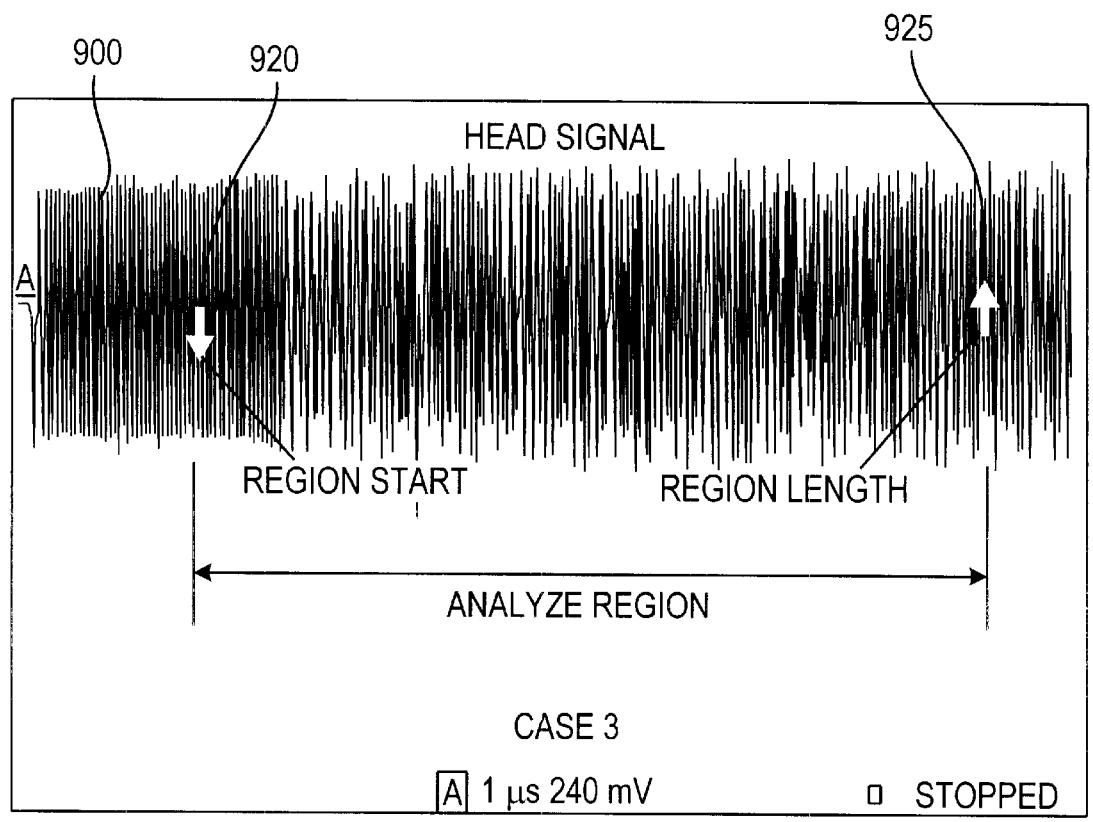
Figure 9D:
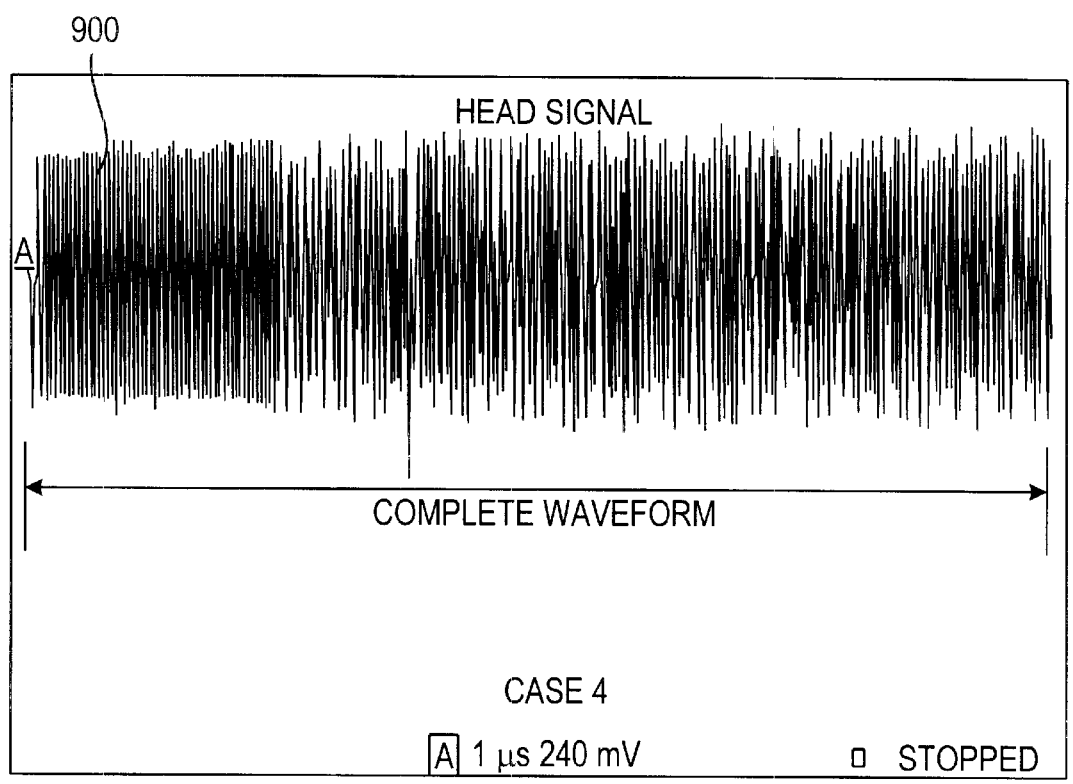

If, as shown in FIG. 9B, the Analyze Region function is disabled and therefore start and end region markers 920 and 925 of FIG. 9A are not provided, the areas 900A–900E of the head signal 900, which are present when the read gate signal is true are analyzed. Furthermore, if as shown in FIG. 9C, the Analyze Region is enabled so that region start and end markers 920 and 925 are provided, but the read gate signal is not present, only the area of the head signal 900 within the region between markers 920 and 925 is analyzed. Finally, as shown in FIG. 9D if neither markers 920 or 925, nor the read gate signal are present, the entire head signal 900 is analyzed.

Since each waveform to be read by a disk drive may have a noise component, or a slightly improperly shaped head signal, disk drives generally have filters to remove noise and shape the head signal. Without these filters it would be difficult to properly recover and analyze the data. Thus, the DDFA apparatus constructed in accordance with the invention provides a similar filter capability so that the DDFA apparatus can analyze a signal similar to that which would be generated as the output of a disk drive. The equalization filter in the channel emulation of the DDFA apparatus can be used with all of the find error methods to clean and shape the signal, much like the channel chip will do. It is preferred that unless the head signal has been equalized before being acquired by the oscilloscope, the filter should be used, otherwise false errors may be reported. If the equalized signal from the disk drive is provided directly to the oscilloscope, the DDFA apparatus filter need not be used. FIGS. 8A and 8B depict the same signal 800 and 800', respectively, before and after using the filter of the DDFA apparatus. As can be seen, it would be very difficult to perform meaningful analysis of the "before" signal due to noise, but the "after" signal is a smooth signal which can be analyzed with greater accuracy. Note that ML Markers ("+" signs) 810 and Level Markers (horizontal broken lines) 820 are displayed with the "after" signal. The ML Markers indicate the location of the ideal PRML sample values based on the channel emulation of the DDFA apparatus. The Level Markers indicate the vertical position of the PRML levels based on the amplitude of the acquired PRML signal.

Figure 15:
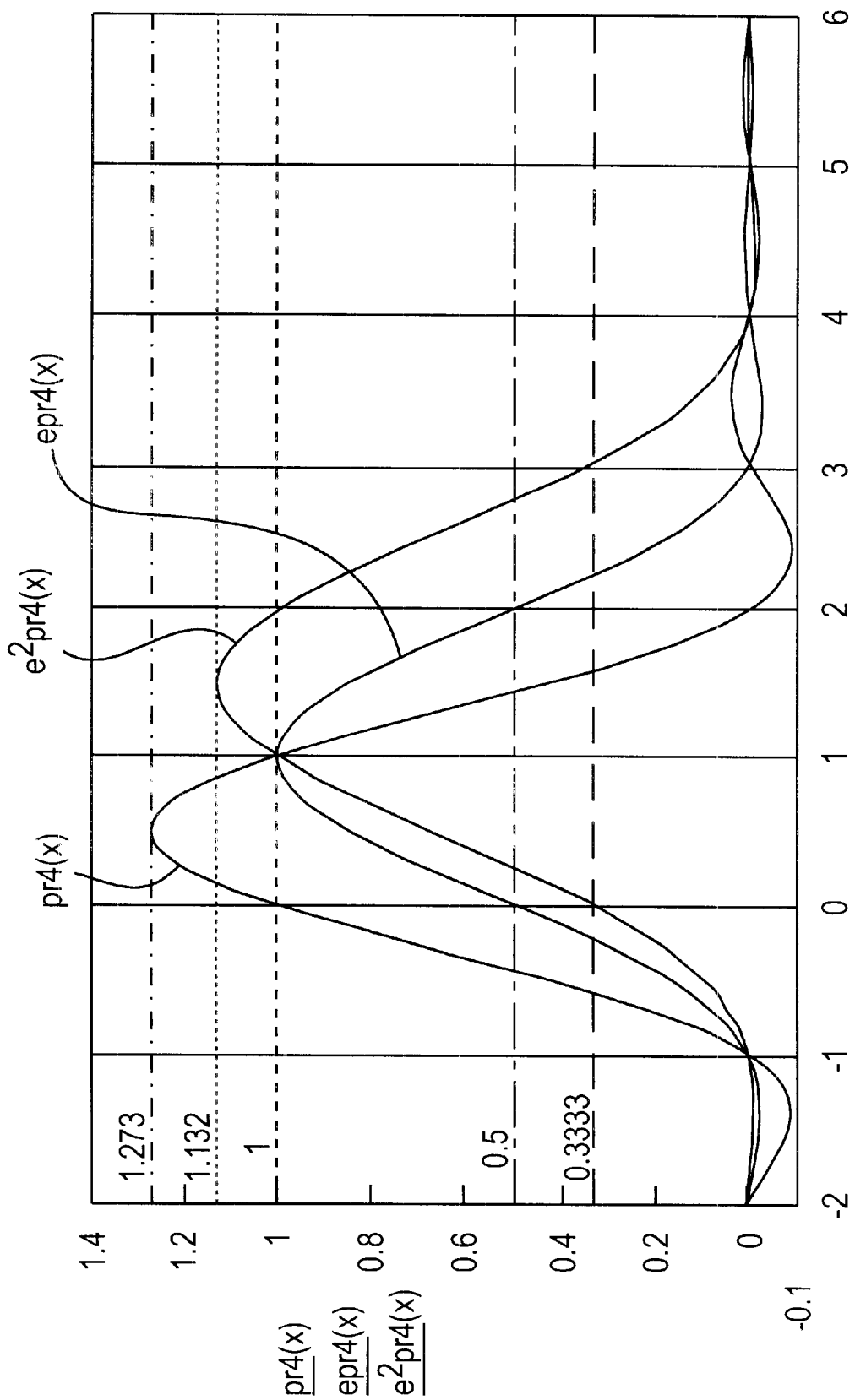
FIG. 15 depicts the relationship between ideal waveforms of different PRML schemes.

In addition to noise which affects the shape and clarity of a signal, systematic errors might be present in the signal to be analyzed. These errors might include a shift in phase of the signal, resulting in the sampling points not being properly positioned along the wave thereby resulting in inaccurate readings. These errors might also include a change in the amplitude of the signal, so that even if the samples were taken at the proper time, the values might be systematically too high or too low, thus also resulting in inaccurate readings. As noted above, the VCO Synch signal is also used to adjust an Automatic Gain Control (AGC) and a Phase Locked Loop (PLL) feature. The phase and gain steering algorithm in the channel emulation of the DDFA apparatus will adjust for changes in the signal after the VCO sync signal has been recognized. As noted above, the read gate signal indicates the location within the head signal of the VCO sync signal. FIG. 15 depicts an example of ideal signal shapes for various PRML schemes.

Finally, while a read clock is not required by the DDFA find error methods, if provided, the DDFA apparatus uses this signal to generate vertical lines on the head signal trace that indicate the location of the clock signal. This is useful for comparing where DDFA PRML sample points occur in time relative to the Read Clock signal.

The find error methods and other features of the invention will now be described. While the invention including these find error methods are preferably implemented on an apparatus including an oscilloscope, the invention would be equally applicable to other apparatus, including but not limited to any other recording medium analysis device.

An Auto Scroll feature automatically scrolls a trace of a signal or all traces of all signals across the screen at a constant rate and may be used with any of the find error methods described below. This feature allows the user to view the signal waveform or multiple signal waveforms without having to constantly turn a knob or press a button. This feature does not require any setup. To access this feature, the user depresses cursors/measure button 641C (FIG. 6A) to display the proper menu and then indicates that auto scroll is desired. Traces A, B, C and D can be scrolled.

Auto Scroll moves all traces smoothly at calibrated speeds of up to 10 divisions per second, in either direction. Typical use is one or two divisions per second. Auto Scroll is stopped by pressing the appropriate soft key from the cursors/measure menu, labeled "Stop" within the menu screen while scrolling is in progress. Auto Scroll is also stopped by leaving the Auto Scroll menu, unless the scrolling is specifically continued by the user.

The first find error method described herein and provided in accordance with an embodiment of the invention is called Byte Offset Position. The DDFA apparatus uses setup information identifying the disk drive type, VCO sync bytes and encoding (which may be entered during setup through setup section 640 of FIG. 6) to automatically identify the byte offset location in which an error may be located. Thus, any time a portion of an analog signal is displayed on screen 609, its byte-offset position is also displayed within menu portion 610. Alternatively, if the user knows the location of an error, such as through the use of computer-customized tools, or the prior use of one of the other find error methods of the invention, the user may dial up the portion of the analog signal corresponding to the byte offset position and observe that portion of the analog signal which corresponds to the byte offset position. Thus, the user may determine what type of error is present at that portion of the signal, if any. There is no need to spend time on calculations and delay changes in order to determine where in the signal one must look to find the error. Rather, the byte offset position informs the user which byte of the waveform is at the center of the scope display, and places any desired byte at that center.

Byte offset is a simple positioning aid, which relieves the user of the need for calculating the position of a portion of a signal. It allows the user to set the display position relative to byte 0, the first user data byte, in each read gate true section of the signal being analyzed. This is achieved by the present invention as follows: Once the VCO synch pattern is analyzed, as noted above, the bit cell time and the location of the end of the VCO synch pattern are determined. The apparatus then skips the header information between the end of VCO synch pattern and the beginning of the actual data portion of the head signal in order to correctly identify the first data byte.

A Code Rate is supplied by the user and establishes how the data bytes within the data field are counted. This code rate allows the DDFA apparatus to count the offset in bytes and segments from the beginning of the data portion. Byte # increases in the scrolling direction as the signal is scrolled. After the read gate goes false, when the position in the center of the display passes the position of the signal where the read gate signal goes true again, the Segment number increases by 1 and Byte # becomes a negative number to allow for the header information. Byte # is zero at the start of the data portion in this next segment.

Byte offset is used on a head signal received via an input channel or on data previously saved in memory. The head signal is provided on one of channels 1–4 and is selected by channels portion 620 of FIG. 6A. A single sector or multiple sectors can be displayed, but the VCO Synch field should be provided at the beginning of the analysis region.

If the read gate signal is not present, the entire input waveform is analyzed, unless the Analyze Region cursors are enabled. These start and end markers may be used to define a subset of the head signal for analysis as shown in FIGS. 9A–9D.

Hard disk drives have very stable speed. Typically disk drive motor speed variation is within 0.1%. If the worst case occurs and the maximum variation occurs within one unsplit sector, Byte Offset nevertheless is accurate to within a couple of bit cells, a fraction of a byte, from one end of the sector to the other. Thus, the Byte Offset is a very accurate measure of position within a signal. Byte Offset is automatically updated to indicate the byte at the center of the display when the waveform is moved by Auto Scroll, or by jumping to an error position, or by turning the horizontal position knob. Furthermore, when the "Byte #" or "Segment #" is changed, and if the horizontal zoom factor shows less than 2 or more than 200 bit cells, in a preferred embodiment the zoom factor is automatically set to show between 20 and 50 bit cells.

Thus, in accordance with the invention, the byte offset feature allows for the viewing of a particular location of a signal without requiring difficult calculations.

Figures 1, 2:
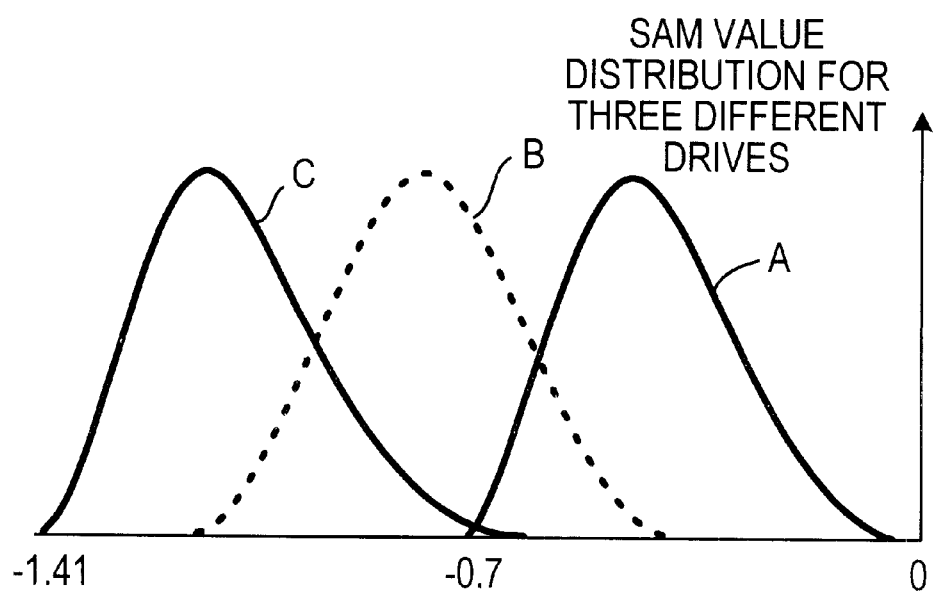
FIG. 1 is a chart comparing data densities of various disk encoding schemes.
FIG. 2 is a graph depicting various Sequence Amplitude Margin curves for different disk drives.
Figure 3:
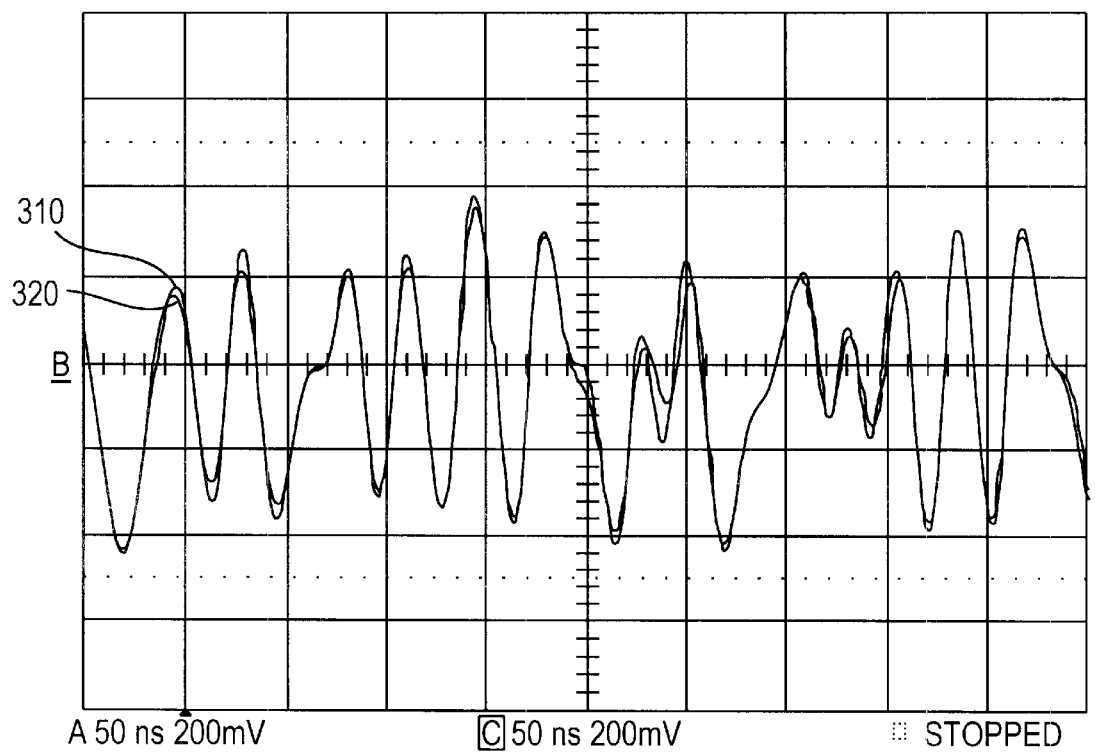
FIG. 3 depicts the results of an exemplary Head/Analog Compare Analysis.

Another find error method provided in accordance with an additional embodiment of the invention is called Head/Analog Compare. This method compares a reference signal to subsequent acquired signals in order to sense large changes in the waveform, or large discrepancies between the reference signal and the input signal. This is a general-purpose test method that can be applied to finding errors in practically any signal, including VCO synchronization fields, data and servo-information. FIG. 3 depicts the output of such an analysis. This mode, as well as entry of each of the required parameters can be accessed through appropriate menus.

During use the user negotiates through the appropriate menus and stores a "good" reference analog waveform 310 and then inputs an input waveform 320 to be tested. The Analog Compare method then begins the comparison of the input signal and the reference signal by aligning the marks at the end of VCO synch portion, which is obtained as noted above. If the waveforms being compared do not contain a VCO synch, and if the read gate signal is not used, or if the analyze region start and end markers are not positioned to allow the DDFA apparatus to analyze the VCO synch pattern, the message "Could not analyze VCO synch at start of signal" is displayed. This is just a warning, and the Analog Compare method proceeds nevertheless. However, the Analog Compare method produces better results if it can analyze the VCO synch portion at the beginning of the analyze region for both the reference and the input head signal.

The Analog Compare method computes the mean square distance between the stored reference waveform and the head signal, over a three byte wide window. The two waveforms are aligned to the nearest sample at the start. As the window is moved across the signal traces, the alignment of the waveforms to the nearest sample is maintained as long as the timing in the reference is within 1% of the timing of the head signal. When the normalized mean squared distance exceeds a predetermined user set analog threshold, an error will be recorded on the error list: the position in the reference and the head signal of the maximum difference are recorded. If the difference remains above the threshold for more than the length of an encoded byte, a new error is recorded at each byte. Errors are ordered in the error list from largest to smallest difference.

As with all of the find error methods described herein, the head signal must be supplied for the analog compare method to operate. Unlike the other methods however, the Analog Compare method performs satisfactorily on any part of the head signal. A reference signal also is supplied in the same manner (same time/div, sample rate, trigger position, etc.) as the newly acquired signals that will be compared to it. Hence, the reference signal should be the same length, and be acquired at the same horizontal and vertical scales. The user also supplies a predetermined, user-specified threshold that is used by the Analog Compare method to decide when to record an error. A typical value for the analog threshold might be about 0.025. The "analog threshold" establishes how large the difference (mean squared distance) between the reference and the acquisition must be to be recorded as an "error". A threshold of zero means that even the slightest difference will be enough. The threshold is normalized to full scale, which means that a setting of 1.000 specifies that the signals must mismatch by full scale over the entire three byte wide analysis window to be recorded as an error. DC mismatch is compensated and does not contribute to measured error "mismatch".

If the waveform amplitude extends from −full scale to +full scale, the formula relating threshold to number of divisions mismatch (without vertical zoom) (average over the analysis window) is: square root (thresh) * 4. By way of example, a threshold of 0.015 corresponds to 0.49 of a division average mismatch within the window 609 of the display (FIG. 6B).

If the read gate signal or analyze region markers are not available and the VCO synch is also therefore not available, the analog compare method attempts to align the signals up to about 12 bit cells difference. If the start of the analysis region is far from the t=0 (trigger) position then small speed variations can cause the waveforms to be too misaligned for the analog compare method to correct. For example, if the start of the analysis region is 15000 bit cell times after the trigger, then a 0.1% speed variation gives 15 bit cell times of jitter at the start of the analysis region. But the analog compare method attempts to maintain alignment for up to 1% speed mismatch.

Yet another find error method provided in accordance with an additional embodiment of the invention is called the Maximum Likelihood Distance (ML Distance) method. This method acquires a single signal trace and predicts the bits where the drive is most likely to create an error. This method uses a full disk drive channel emulation to indicate how the signal ought to appear when a good reference signal is not available. It measures the Sequential Amplitude Margin (SAM), i.e. the distance or margin the Viterbi detector has for making a decision, of all the samples (PRML clock locations). The apparatus in accordance with the invention emulates a PRML channel and ranks errors by SAM value. A distance or SAM value of "0" indicates no margin for a decision and the detector's lack of certainty as to whether the digital bit should be "1" or "0". The positions of the 100 worst margins are identified and can be displayed along with the SAM value of each error. Thus, by using complete disk drive channel emulation, the ML Distance method predicts where errors are in the head signal when a good reference signal is not available.

The ML Distance method starts by finding the beginning of the sector to be analyzed and VCO synch portion thereof, as noted above, in order to establish sampling phase and expected sample levels. The acquired data signal is then passed through the emulated channel where it is appropriately sampled. The sampled output enters the Viterbi detector which chooses the 'sequence' of bits (history) that, when the new bit due to this sample is appended, is the most likely. The difference between the mean squared distance (msd) of the selected sequence and the other possible sequence leading to the selected state (Sequenced Amplitude Margin) is then calculated. For each sample fed into the Viterbi detector, the ML Distance is the SAM value at each decision. In one embodiment, the ML Distance method also detects and reports run length limit violations. Errors detected in "garbage data" areas indicated by the user are ignored. Thus, only the data which a user wishes to be tested will generate errors stored by the apparatus.

Figure 4:
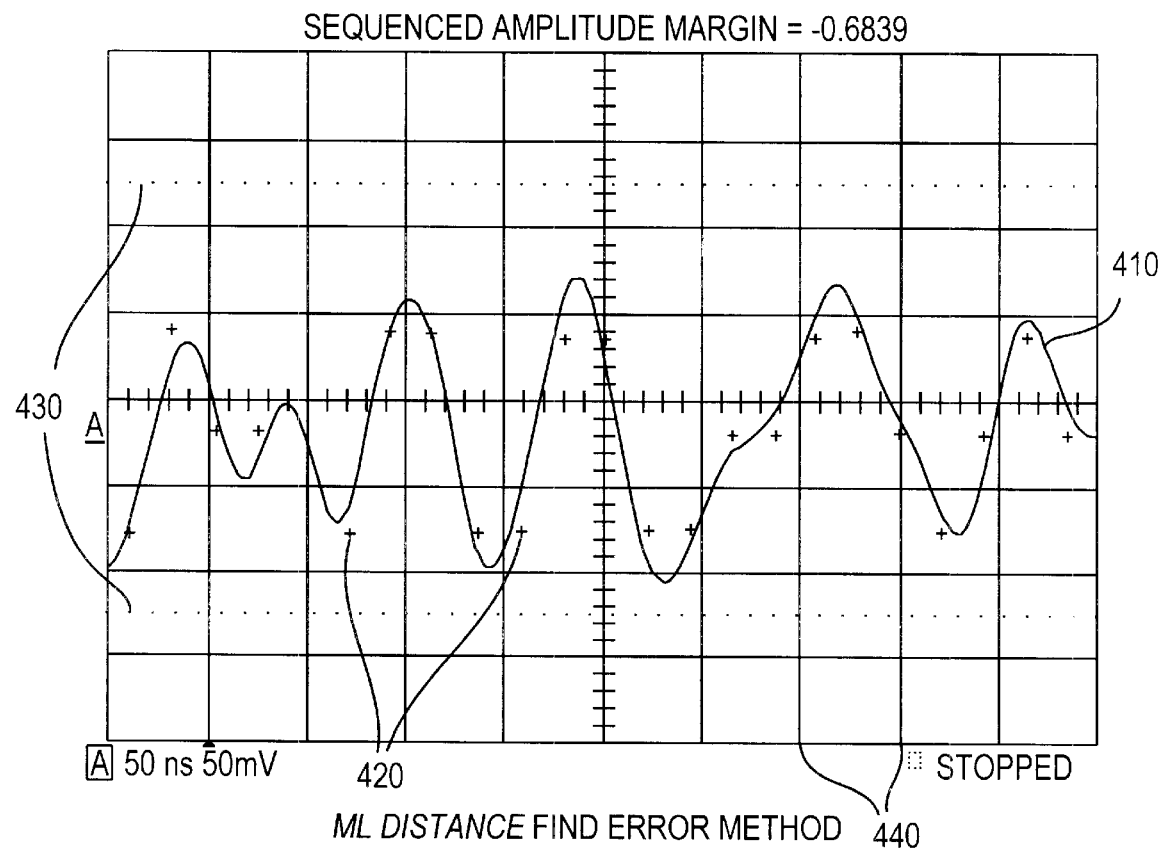
FIG. 4 depicts the results of an exemplary Maximum Likelihood Distance analysis.

As shown in FIG. 4, when the ML Distance error detection method is utilized, the "ML markers" ("+" signs) 420 are automatically displayed. These show the maximum likelihood sample sequence chosen by the channel emulation of the present invention, based on the signal 410 and the possible sequences. They are displayed at the expected level at the time the head signal is sampled. If the "+" signs are all very close to the waveform then the signal is good. If the "+" signs are not close to the waveform, then the signal may not be good. The signal not being "good" indicates that there may be more errors, since the actual signal differs by a particular amount from an ideal signal. Additionally, the user can activate "Level Markers" 430, i.e. horizontal lines which show the expected levels at the center of the screen.

The ML Distance method can be used on newly acquired channel data or data previously saved in a memory. However, if the VCO synch field is not found, the ML Distance method will not be able to analyze the signal. Thus, the read gate or analyze region markers should be set by the user. If not, the DDFA apparatus will still attempt to analyze the entire waveform to find the VCO synch. Also, the user should specify the type of PRML channel or encoding scheme being used so that the DDFA will search for the appropriate signal levels.

As noted above, the apparatus determines that an error is present whenever the SAM is less than a predetermined SAM Threshold. SAM, or Sequenced Amplitude Margin, is the difference in mean squared distance of the samples observed from the sequence of samples determined to be the likely sequence, to another sequence of samples which was discarded at that decision point. As the Viterbi detector receives each sample, the detector chooses between two possible sequences, which leads to the state it selects. The sequence with the best fit determines which state is selected. SAM indicates how much worse the other sequence is, when it is discarded from further consideration. "0" means the Viterbi Detector has no preference at all between the sequence it chose and the one it discarded. The most negative value is the "minimum error distance" for the selected signal type, and implies excellent certainty about which sequence to keep.

Near zero SAM values are due to distortions in the shape of the head signal. Problems causing distortions, which the ML Distance method can find, include media defects and drop outs, asperities, noise bursts, or a bad head. (Noise bursts are sometimes obscured by the equalization filter, and just result in a distorted shape of a pulse. This can be verified by observing the unfiltered waveform also.) Since it performs an analysis without a reference, the ML Distance method cannot determine if the decisions it makes actually correspond to what was recorded on the disk drive because this method senses how good the head signal looks when the disk is read.

In order to improve the ability of the ML Distance method to sense missed transitions, the user may set a limit for the run length. If run length limit is not set, no count of successive non-transitions is made to detect run length errors, and the ML Distance method only reports errors due to difficulty deciding on a sequence of samples (small SAM). If run length limit is set, the apparatus indicates when the specified number of non-transitions in succession are encountered.

The ML Distance find error method "finds" errors by emulating in software a typical disk drive channel chip and predicting the error from the analog head signal through the use of the Viterbi detector. The operation of the Viterbi detector when detecting signal values will now be described. This detection operation is used not only with this find error method, but also with the ML compare method (described below).

As noted above, the Viterbi detector detects transitions between various waveform levels. In a PR4 PRML channel emulation 3 level values are possible. They are +1, 0, and −1. In an EPR4 PRML channel emulation, 5 level values are possible. They are +1, +0.5, 0, −0.5, and −1. Finally, in an E2PR4 PRML channel emulation, seven level values are possible. They are +1, +2/3, +1/3, 0, −1/3, −2/3, and −1. Thus, when displayed, the DDFA apparatus can display level markers 430 indicating the appropriate ideal signal levels.

During analysis these levels must be differentiated from each other. For accuracy, these levels are measured from the input signal at appropriate sampling times. Thus, as noted above, the DDFA apparatus adjusts the sampling of the signal to coincide with the appropriate portions of the signal. During analysis, the DDFA apparatus samples the input signal at the appropriate interval, and the Viterbi detector indicates, by an ML marker 420 the interpreted value, such as shown in FIG. 4. The proximity of the actual signal to the detected level is measured by the SAM, as noted above. The procedure is then followed for each sample of the signal. A list of the worst (least negative) margins for ML samples is stored. The list is maintained in sorted order, worst margin first. A histogram of all margins for ML samples, and a count of samples (some of which may not fall within the limits of the histogram) is also stored. Thus, the Viterbi detector determines each sample value, and the SAM indicating the quality of the head signal being tested.

Figure 5:
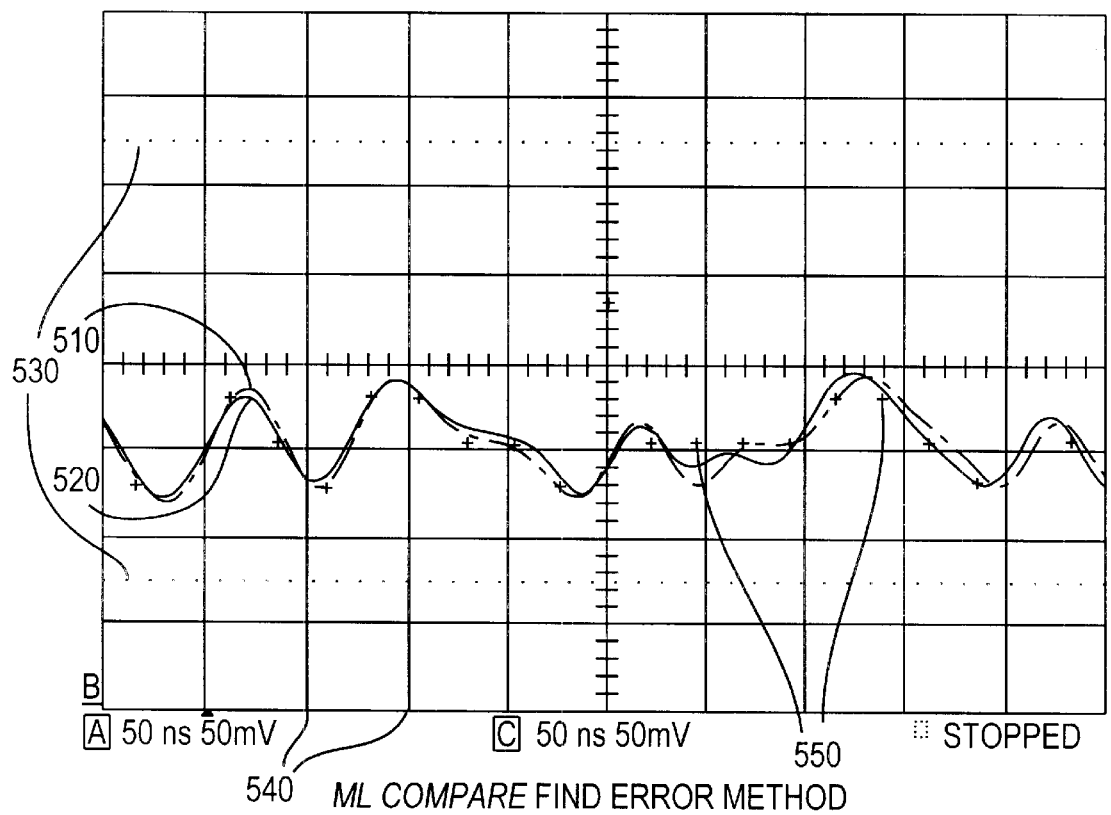
FIG. 5 depicts the results of an exemplary Maximum Likelihood Compare analysis.

A further find error method provided in accordance with an additional embodiment of the invention is called Maximum Likelihood Compare (ML Compare). As is shown in FIG. 5, whereas ML Distance acquires a single trace and makes a prediction, ML Compare calculates the Viterbi output of a reference signal 520 as well as that of a newly acquired signal trace 510, and compares the two to find mismatches.

During operation, ML Compare starts by finding the beginning of the sector to be analyzed and VCO synch as noted above. ML Compare aligns the two bit streams it is comparing based on the end of the repetitive VCO synch pattern. If there is an error within the VCO synch pattern, such error is detected along with other mismatches which do not actually exist but are sensed due to incorrect alignment.

The data from the newly acquired signal is then passed through the emulated channel where it is appropriately sampled. The sampled output enters the Viterbi detector which chooses the "sequence" of bits (history) that, when the new bit due to this sample is appended, is the most likely using the procedure as noted above. The output of the Viterbi detector is then compared to the stored output generated from the Viterbi detector after processing a reference signal. Differences between the processed outputs are recorded in a memory location and displayed as errors. The Viterbi detector, as well as the various data structures utilized are the same as those noted above with respect to the ML Distance find error method. Errors detected in a "garbage data" area are ignored.

When the ML Compare method is used, the "ML markers" ("+" signs) 550 are automatically displayed, as in the ML Distance method. These show the maximum likelihood sample sequence chosen by the channel emulation, based on the head signal and the possible sequences. These markers are displayed at the expected level at the time the channel samples the head signal. Since the ML Compare method uses a stored reference signal 520, the reference trace will overlap the head signal 510. The ML Compare method uses the same channel emulation as the ML Distance method.

In operation, a reference signal is stored in memory for comparison to the later acquired input signal and then a signal is acquired to be analyzed by using processing selected by appropriate menus. Additionally, the user specifies the type of PRML channel for the signal so that analysis may be properly performed. PLL and AGC features noted above are also provided with this find error method. Thus, any time misalignment between the reference signal and the current acquisition signal is compensated based on the timing at the end of the VCO synch signal in the first read gate true section. If the reference signal contains multiple read gate true sections, it is assumed that the relative timing of the reference signal in these sections is approximately the same as the current acquisition. The parameters required by the ML Distance method are also required here.

Yet another find error method provided in accordance with an additional embodiment of the invention is called the Non Return to Zero (NRZ) Compare method. Unlike the other find error methods, which operate on the head signal, the NRZ Compare method uses the digital output NRZ data lines of the channel chip. In accordance with the invention, a logic probe is provided for implementation of this find error method. In a preferred embodiment, such a probe allows for up to 12 NRZ data lines, read clock and control signals to be coupled to the DDFA apparatus of the invention.

A digital reference to which subsequently acquired NRZ signals are compared is input to or generated by the apparatus. When a difference between the reference data and subsequently acquired data occurs, the logic probe triggers the oscilloscope to capture the portion of the analog head signal corresponding to the location of the data mismatch. Thereby, the user can review the NRZ data errors and the corresponding portions of the analog head signal locations to determine the cause for the errors. This error finding method allows for the location of very intermittent, difficult-to-find errors.

Figure 10:
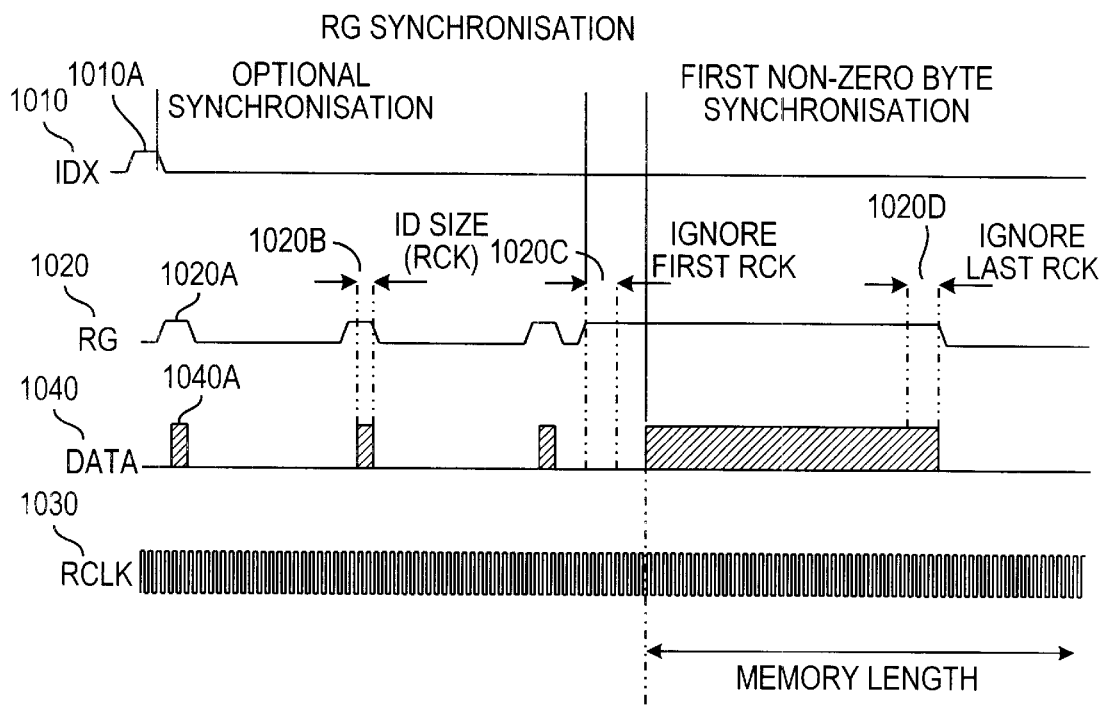
FIG. 10 depicts a portion of NRZ data.

The structure of the NRZ Data is depicted in FIG. 10. During use of the NRZ Compare method, the user sets up the probe to acquire a reference as follows: The user selects the reference signal acquisition technique by reading it from a memory location, or by receiving the reference signal from an input line and storing that signal for later use. The user then selects whether or not an Index Pulse 1010 is to be used for synchronization. If the user wants to ensure that only a specific section of the disk is read, then the beginning of the reference signal should be synchronized with the Index Pulse. The user then specifies the number of NRZ lines, which determines the maximum compare width between the reference and newly acquired signals. Finally, the user sets the polarities of the gate signal (read gate or write gate as selected) 1020, index signal 1010, clock signal 1030 and NRZ data signal 1040.

In operation, the reference signal first is acquired. The apparatus waits for the next index pulse 1010A. On the first non-zero NRZ word while the gate signal 1020A is true, the probe begins storing data 1040A. One NRZ word is stored during each clock signal. The probe continues to store the reference data whenever the gate signal 1020 is true until the number of NRZ words reaches "Max Data" or, alternatively, when the next index pulse 1010 occurs after some data has been acquired.

The apparatus then reads out the acquired reference data from the probe, and reformats it for comparison. During reformatting the first "Ignore first" NRZ words 1020C are ignored and the last "Ignore last" NRZ words 1020D of each section are removed from the reference data (corresponding to the "garbage data" areas of the prior find error methods). Any blocks of data (a block is a section of data captured when the read gate or write gate signal is true) that are smaller than the user specified "ID size" 1020B are discarded. After reformatting, the reference signal information acquired by the probe is stored in memory storage.

Now that the reference has been acquired, the probe is ready to compare the reference data to a newly acquired signal. The apparatus is operable in two modes. The first, "ALL BLOCKS" mode, compares all the data previously captured as a reference signal to all the data of a subsequently acquired signal. This is useful when the user wishes to compare specific sectors for errors. In this mode the apparatus uses Sync on Index for synchronization to make sure the reference signal and currently acquired signal start in the same place.

When the comparison begins, the probe waits for a "gate true" section of the newly acquired NRZ data longer than the ID size. If the probe encounters a "gate true" section which is shorter than the ID size, the probe simply resets, and waits for the next "gate true" section. Thus, no mismatches will register as errors. This allows the probe to skip ID fields (if any) before analyzing the desired data.

The data represented by the first "gate true section" of the reference signal is compared to the data represented by the current section of the newly acquired signal, the next section of the reference signal is compared to the next section of the newly acquired signal and so on. If the length of the acquisition section is less than the ID size, any detected errors are ignored. If the length of the acquisition section is greater than the ID size, if any mismatches are detected between the digital data represented by the compared signals, the probe triggers the oscilloscope when the gate signal goes false, and the location of the mismatch is recorded in a memory location. Then, the portion of the analog head signal corresponding to the location of the mismatch is displayed. If no mismatches are found, the probe resets to the beginning of the reference signal, and the apparatus waits for the input of additional NRZ data.

Figure 11:
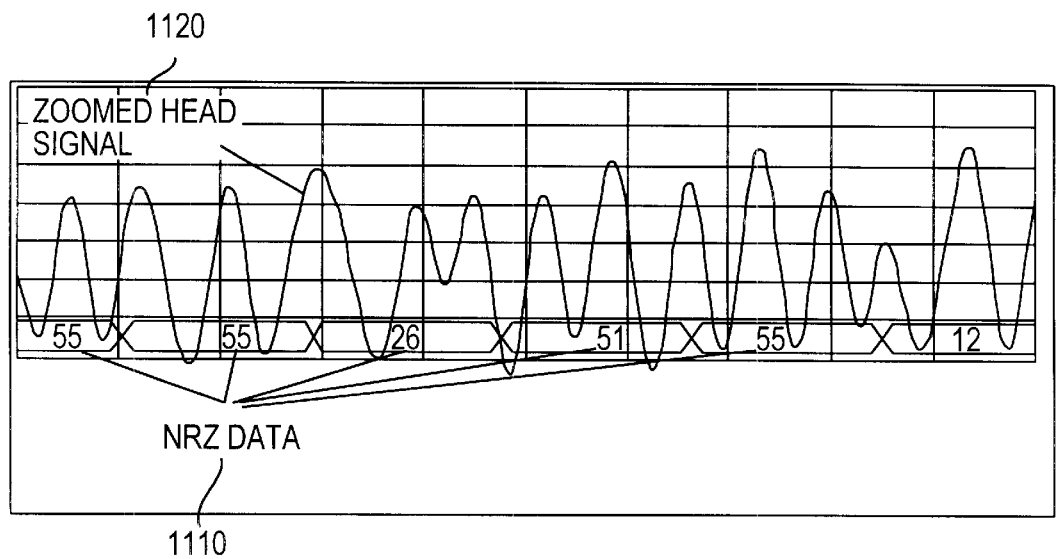
FIG. 11 depicts a display of exemplary NRZ data and a corresponding exemplary analog head signal.

If errors are detected, the location of each of these errors is stored for subsequent review by the user. As shown in FIG. 12 a list of the digital data containing mismatches is displayed. Block designates the block number and RCLK# designates the number of the read data. Ref addr designates the data address in the reference data and ref. data designates the data value at that address as determined by the Viterbi detector. NRZ addr. designates the data address in the newly acquired NRZ data and NRZ data designates the data value at that address as determined by the Viterbi detector. The "*" indicates the location of an error (the data values do not match). The user is then able to review the corresponding sections of the analog head signal where the NRZ errors have occurred. The locations of the errors in the digital data are automatically correlated to the appropriate portions of the analog signal. Such a display is shown in FIG. 11. The NRZ data 1110 is depicted along the bottom edge of the display while the corresponding analog head signal 1120 is depicted overlaying the NRZ data. The appropriate portions of the analog signal can be selected and viewed by using an "Error #" knob to view any one of the errors.

In the "FIRST BLOCK" mode, the probe compares the first block (read gate true section) of data in the NRZ reference signal to each block of data in subsequently acquired signals. This mode is used to store a single block (read gate or write gate true section) of data as the reference signal, and then read random blocks on a disk that should have the same pattern. Only blocks of data that are at least as long as the stored block are compared.

During use, the logic probe is connected to receive Read Gate signal 1020, Read Clock signal 1030 and the data from NRZ lines 1040 from the channel chip. Additionally, the head signal, and a reference for storage and later comparison are received. The user may also apply an equalization filter to the head signal before processing and display.

Figure 13A:
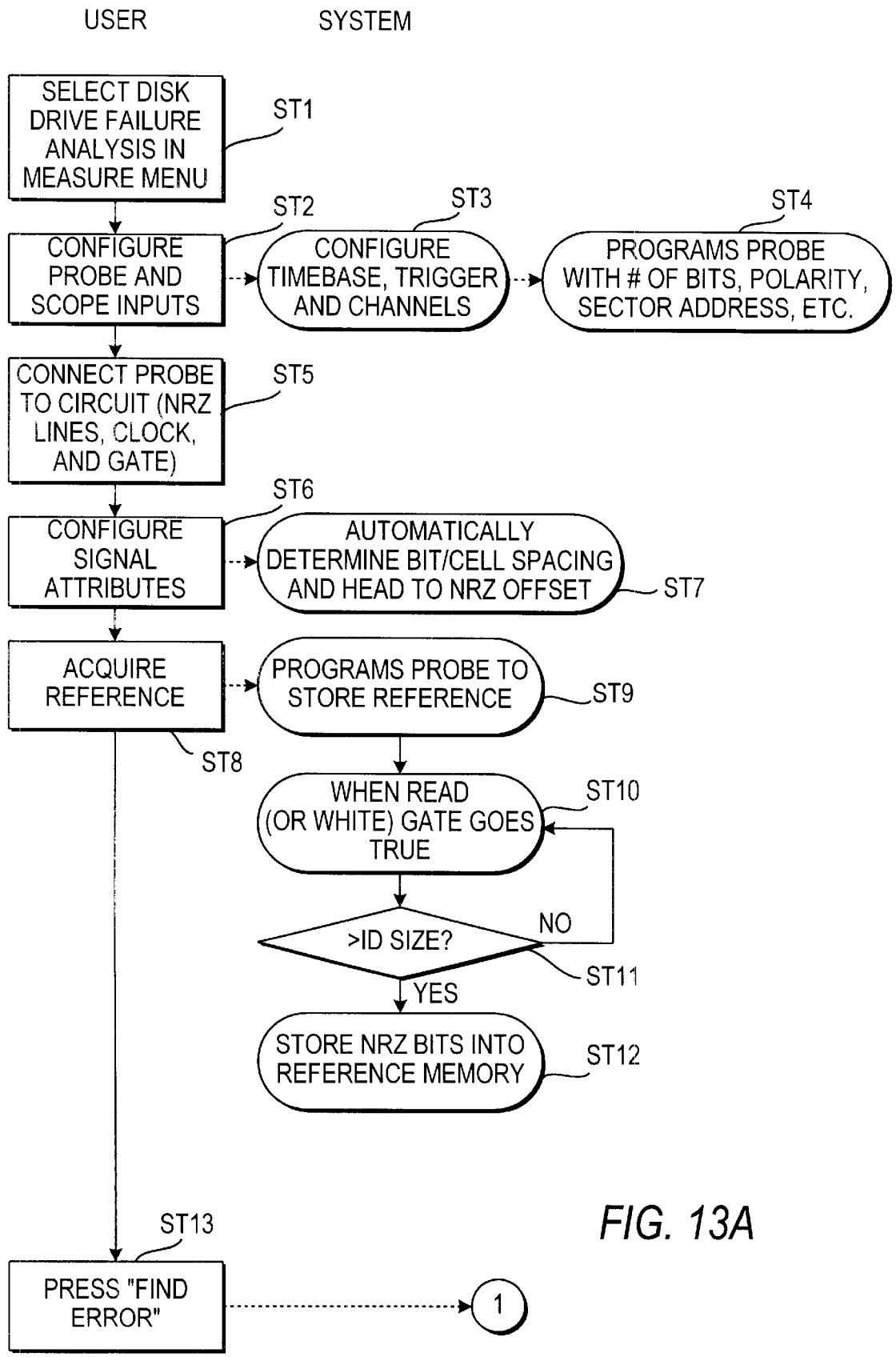
FIGS. 13A and 13B depict a flowchart for setting up and using an NRZ probe in accordance with the invention.
Figure 13B:
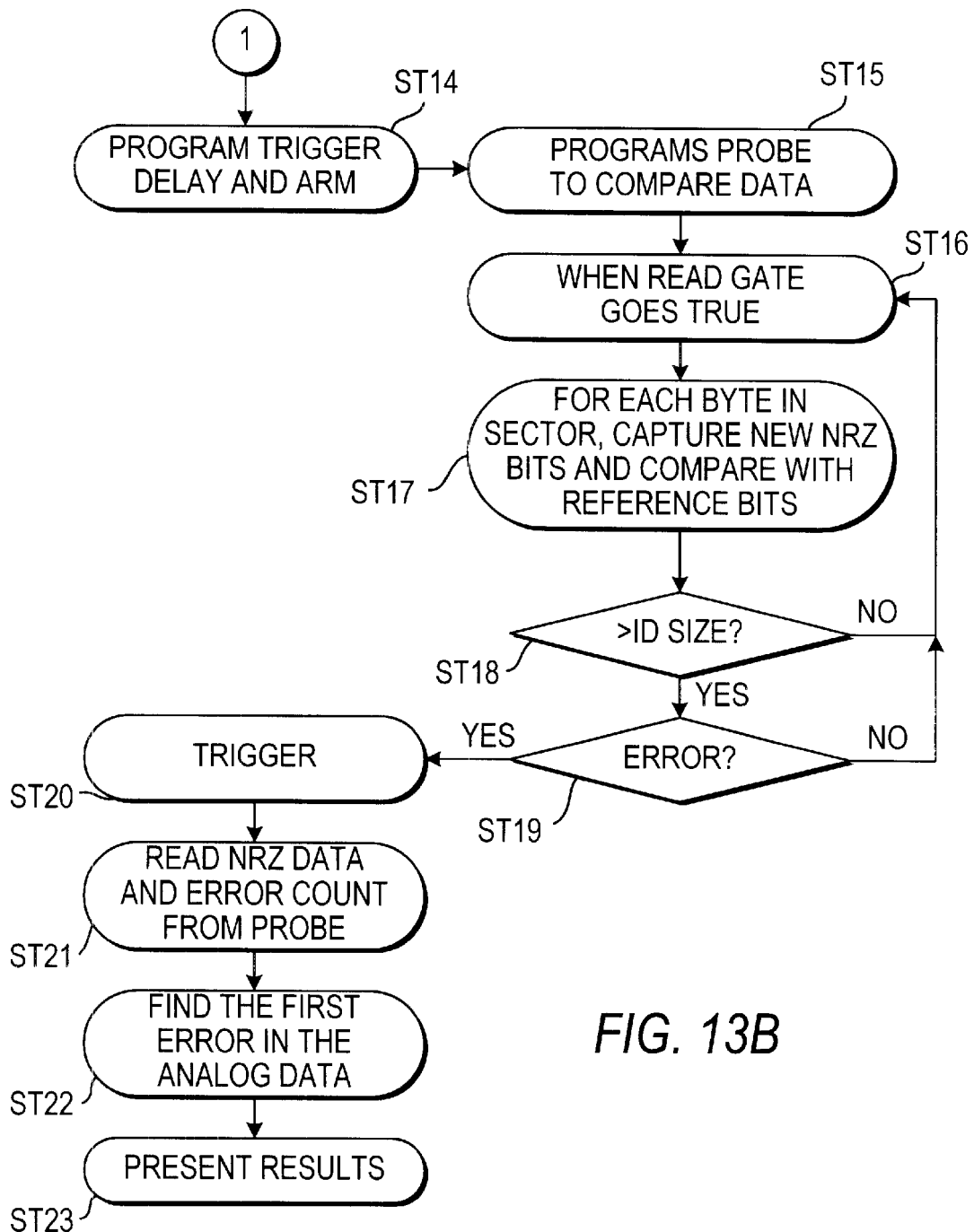

The NRZ find error method uses a logic probe as aforementioned; and the steps for configuring and using the probe are set forth in the flowchart of FIGS. 13A and 13B. As is shown in FIG. 13A, in step ST1 a user selects Disk Drive Failure Analysis from the Measure menu by pressing cursors/measure button 641C and then selecting NRZ by depressing the appropriate one of menu buttons 656 located next to the NRZ designation in menu display 610 (FIGS. 6A, 6B). Then, in step ST2 the probe is configured by entering the appropriate data through the apparatus menus, such as the timebase, trigger and channels in step ST3 and bits #, polarity, sector address, etc. in step ST4. Then in step ST5, the probe is connected to the apparatus, and the configure signal attributes menu is entered in step ST6. In ST7, the system automatically determines the bit/cell spacing and NRZ offset.

After the parameters are stored, the user presses waveform store button 641B to store a reference signal in step ST8, which automatically invokes steps ST9–ST12. These steps check each sector when the read or write gate signal goes true, confirms that the reference signal section to be stored is longer than ID size, and then stores the reference signal. The probe now is ready to detect errors.

In order to begin the error detection, in step ST13, the user presses the find error button from the appropriate menu. Then in step ST14 of FIG. 13B the trigger signal is programmed and the apparatus is armed to receive an input NRZ data stream for analysis. In step ST15 the probe compares the newly received data to the stored reference data by determining in step ST16 when the read gate signal is true, comparing each data bit in step ST17, and checking that the segment of the newly received acquisition section as determined by the read gate is greater than the ID size in step ST18. In step ST18, if the segment size is not greater than the ID size, the probe resets, control returns to step ST16, and the apparatus awaits the input of the read gate true signal. If it is determined that the segment size is greater than the ID size, then in step ST19 it is determined if there is a difference between the input data and the stored reference data, thus indicating an error. If so, in step ST20 the apparatus is triggered to read the NRZ data and error count in step ST21. If not, the probe resets, control returns to step ST16, and the apparatus awaits the input of the read gate true signal. Then in step ST22 the probe finds the portion of the analog head signal corresponding to the data error, and in step ST23 the results are presented as noted above.

Figure 14:
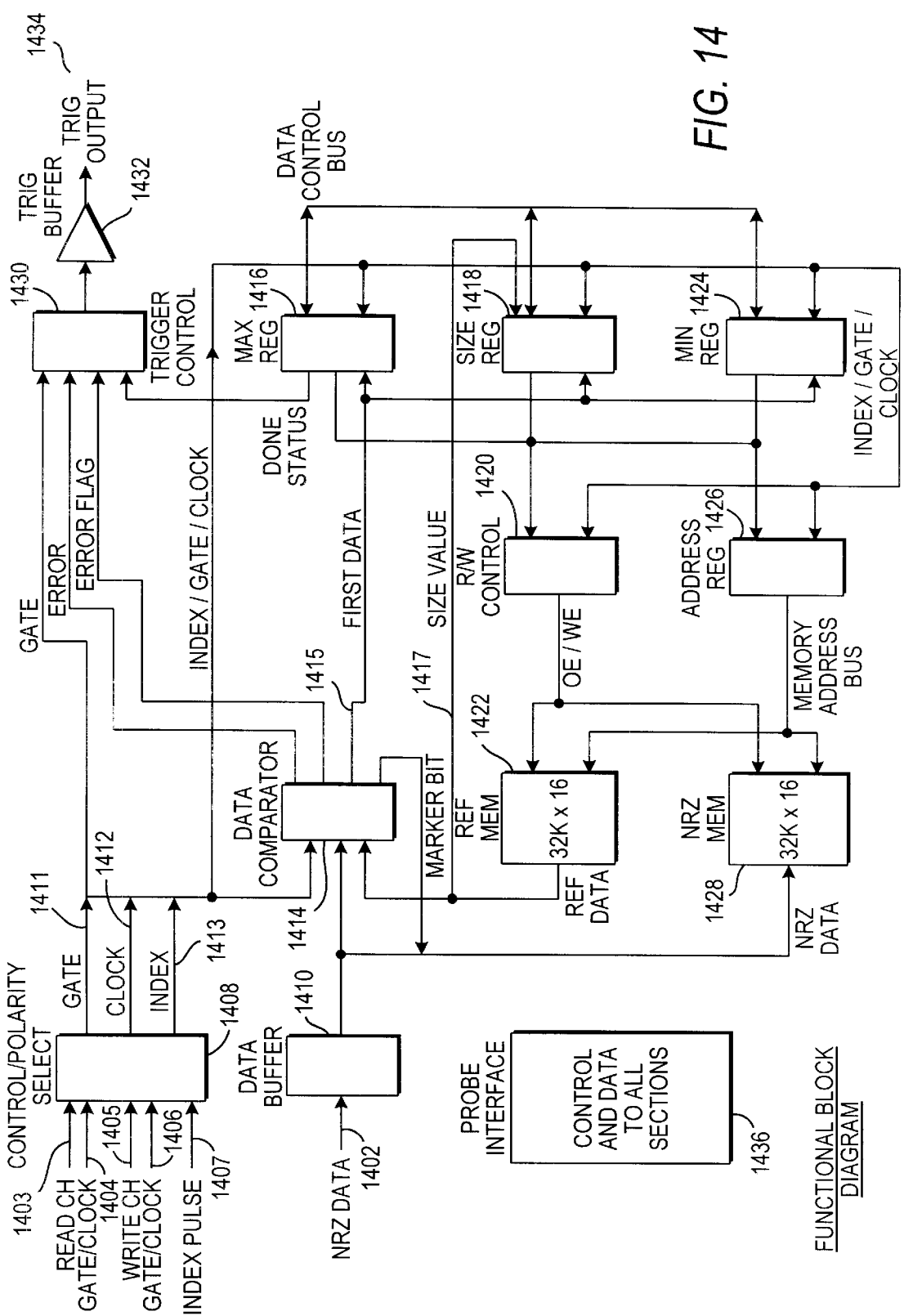
FIG. 14 depicts a block representation of an NRZ probe constructed in accordance with the invention.

The NRZ probe allows the dual feature of acquiring digital NRZ data and finding corresponding portions of the analog head signal when an error is found. The NRZ probe constructed in accordance with a preferred embodiment of the invention is preferably designed as shown in FIG. 14, and has the following specifications.

The NRZ probe includes a probe interface 1436 to control all operations of the probe, and to interface the probe with the analyzation apparatus, the probe has inputs of 12 parallel data bits on input line 1402, a read gate (channel enable) signal at 1403, a read clock signal at 1404, a write gate (channel enable) signal at 1405, a write clock signal at 1406, and an index pulse signal at 1407. Signals 1403–1407 are fed to a selector 1408 which selects between the read gate, write gate or index pulse in order to define the portion of the input NRZ data which is to be analyzed. The NRZ data input lines 1402 are fed to a data buffer 1410, and in turn to data comparator 1414 and an NRZ memory 1428. A gate signal 1411, a clock signal 1412 and an index signal 1413 are transmitted from selector 1408 and input to a data comparator 1414. Gate signal 1411 is also forwarded to a trigger control 1430, a maximum size register 1416, a size register 1418, a minimum size register 1424, a read/write control register 1420 and an address register 1426 so that all components of the system are coordinated.

If the NRZ data input at 1402 is the first input data, and is to become the reference data, then the NRZ data is fed to NRZ memory 1428 and to data comparator 1414 from data buffer 1410, under the control of probe interface 1436. As data comparator 1414 reads the input NRZ data, a marker bit is added to the data stream at the start of each data portion (read gate true signal) to indicate the beginning thereof. Thus, when this NRZ data with marker bit is received by NRZ memory 1428, it can be properly stored in a predetermined format, and can then be transferred to reference memory 1422 under the control of read/write control 1420 and address register 1426 in order to be stored as reference data. In addition the NRZ data and marker bit, reference memory 1422 also stores for each data portion (read gate true section) the number of data to be tested in the read gate true section.

If, however, the input NRZ data being forwarded from data buffer 1410 is new NRZ data to be compared to reference data, then the data is forwarded to data comparator 1414 as well as to NRZ memory 1428. The incoming NRZ data and reference data is clocked into data comparator 1414 by the gate, clock and index signals 1411, 1412 and 1413. When gate signal 1411 indicated that a read gate has gone true, data comparator 1414 checks the incoming data signal to determine the beginning of the data to be analyzed, as noted above. Once the beginning of the data section to be analyzed is found, a first data flag 1415 is transmitted to maximum size register 1416, size register 1418 and minimum size register 1424, which are all reset in response thereto.

Data comparator 1414 is then ready to compare the input NRZ data to the reference signal to determine if a mismatch occurs (see FIG. 12). Thus, the apparatus loads the reference signal from reference memory 1422. The size information indicating the size of the data section to be analyzed is forwarded on size value line 1414 to size register 1418. This size value indicates to read/write control 1422 the amount of data that will be read out from reference memory 1422 during this read gate true data section. During this read out, maximum size register confirms that the data to be read out is not greater than a maximum size which is to be analyzed by the apparatus, and minimum size register 1424 confirms that the size of the data is not less than a predetermined ID size (noted above).

Thereafter, each data bit is read from reference memory 1422 under control of read/write control 1420, and is compared to the incoming NRZ data. If an error is encountered, indicated by a difference between the reference data and the NRZ data, and error flag is fed to trigger control 1430 indicating that an error has occurred within the analyzed segment. Additionally, an error indication bit indicates the precise location within the segment where an error is found. Trigger control 1430, through trigger buffer 1432, then outputs a trigger signal 1434 informing probe interface 1436 to find the portion of the analog head signal corresponding to the location of the data mismatch. This portion of the analog signal is then displayed on the display portion of the apparatus.

Thus, NRZ probe interface 1436 constructed in accordance with the invention has a number of operating modes and is designed to:

produce a signal on the first non-zero NRZ signal after the read gate signal is true (used for finding head to NRZ delay);

store (internally) the "reference" NRZ signal;

compare and save an arriving NRZ signal to a saved reference signal to produce a trigger when the comparison fails;

report status via the probe interface, so that the apparatus can wait for the comparison to stop (sector complete) before attempting to read information from the probe;

produce an "abort" command to terminate a comparison operation in progress and force the probe to the standby state;

read out the reference NRZ signal and the "bad" NRZ data via the probe interface;

drive the trigger with either the comparator output or with the read gate signal. The read gate signal may be fed through a digital input, rather than one of the standard input channels, to enable the apparatus to trigger on the read gate signal or NRZ mismatch without using up one of the four channels.

For interpreting and testing split sectors, the NRZ probe begins acquiring data or carries out a comparison on the first non-zero bit on the digital data lines ("NRZ") after the read gate signal goes true. If the read gate signal goes false before a user selected, predetermined number of bytes, the comparison between the NRZ data and the reference data automatically continues after the read gate signal goes true again and the NRZ output resumes.

The probe accommodates multiple mismatches in a sector by halting comparison at the end of a sector (read gate signal goes false) after one or more mismatch has occurred. Error information is stored locally and may be read out by the apparatus.

Each time the read gate signal goes true for the selected sector being analyzed, the probe compares each NRZ data from NRZ data buffer 1410 with data from reference memory 1428 at data comparator 1414. On each "read clock" the data comparison is made and the memory address of address register 1426 is incremented. Should any of the data comparison at data comparator 1414 fail, the oscilloscope is triggered at the end of the sector, that is, when the read gate signal is false, the apparatus identifies the portion of the analog waveform that caused the data error(s) and this portion of the analog signal is displayed by the apparatus, as noted above.

The use of the NRZ probe in connection with the DDFA apparatus provides many advantages, including by way of example only, the following.

1. Real time compare. Keeps up with consecutive sector reads until there is an error and the DDFA apparatus processes the error.

2. Occupies external input of the disk drive failure analysis apparatus, not one of the four regular input channels while providing the information needed from the Read Gate and from the NRZ outputs, thus allowing for additional information to be provided to the apparatus.

Selection of the error finding method is made by the user based upon the type of error the user is attempting to find, and the information that is available to the user. For example, selection is based upon whether the byte position of the error is known, whether a reference signal is easily available, whether the error is repetitive or intermittent, and whether there is access available to the NRZ lines.

Generally an error is identified as a result of an Error Correction Code (ECC) error occurring for a particular sector. If the byte location of the error(s) is available and repetitive, then simply using the Byte Offset find error method allows the user to easily view the corresponding portions of the analog head signal. In order to analyze the head signal with additional insight if the byte offset position is known, the user may select the ML Distance find error method and select the byte location where the error(s) occurs. This mode initiates he DDFA channel emulation; and the user thereby compares the ideal sample values to the actual equalized head signal, at the byte-offset location of the errors. Thus, the user gains further insight into the reason for an error.

Since the NRZ Compare method compares actual NRZ data, this find error method is able to determine with certainty the location of data errors. In the NRZ compare mode, NRZ data received from the disk drive is compared in real time to stored reference data. When differences are identified, the probe triggers the apparatus to display the discrepancies in the acquired data and the corresponding analog head signal locations so they can be properly analyzed. Because this find error method is triggered by errors, in the form of differences in data as they occur, the NRZ Compare method is especially useful for intermittent, infrequent errors. While the other find error methods continue to reacquire and analyze the head signal until an error is identified, after the error has been identified and is being analyzed, the next signal cannot be captured. As a result it may take more time with the other find error methods to capture an infrequent error. Because the NRZ Compare method can immediately identify a failure as it occurs, even if it is an infrequent error, this NRZ find error method can shorten the time to capture such an infrequent error.

The NRZ Compare method utilizes reference data. The reference data can be captured and stored in the reference memory while information is being written to the disk, such as when a test pattern is written, or while information is being read from the disk. When the NRZ data from a subsequent read operation differs from the stored reference data, the probe indicates an error.

While the NRZ Compare method is advantageous in that it compares actual output data, this method may be difficult to implement because it requires a direct connection to the NRZ data lines. If the user repeatedly examines a disk drive for a period of time, this may not be a problem.

The ML Compare method is useful if the error is not infrequent and a reference analog head signal is available. This method performs a channel emulation of the reference signal and the acquired head signal, and accurately predicts where the Viterbi detector will identify different values.

The Analog Compare method is useful for all parts of the head signal such as, VCO synch, servo burst, data field etc., and is advantageous for identifying the location of errors in peak detect signals and in PRML signals.

The ML Distance method does not need a reference signal and, therefore, is the easiest of the find error methods to use for PRML signals. Error detection is based on analyzing the quality of the head signal. However, head signal sections that are interpreted incorrectly as NRZ data, are much more likely to be marginal when analyzed by the Viterbi detector. The most marginal sections are the first ones flagged by the ML Distance method as errors, except that sections with no signal may not be flagged by the Viterbi detector. However, if the limit run length feature is enabled, sections with no signal are identified as errors if such sections exceed the run length limit. Because it is the easiest to use of the methods described herein, the ML Distance method is generally the best find error method to use first.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method of analyzing a signal received from a recording medium, comprising the steps of:
   receiving an input signal from said recording medium;
   determining a portion of said input signal likely to show an error; and
   automatically displaying said input signal corresponding to the portion thereof determined to be likely to show an error.

2. The method of claim 1, further comprising the steps of:
   receiving a reference signal;
   analyzing said reference signal;
   comparing analyzation results of said input signal with analyzation results of said reference signal; and
   determining the location of errors within said input signal by determining where said analyzation results of said input signal differs from said analyzation results of said reference signal by more than a predetermined threshold amount.

3. The method of claim 2, wherein said reference signal is input on a channel different from a channel upon which said input signal is input.

4. The method of claim 2, further comprising the step of retrieving said reference signal from a memory location.

5. The method of claim 2, further comprising the step of displaying a position corresponding to the location of said determined error.

6. The method of claim 5, wherein said position is indicated as a byte offset from a first byte of data of a portion of said input signal.

7. The method of claim 2, further comprising the step of synchronizing said input signal and said reference signal utilizing a repetitive synchronization portion of each of said signals.

8. The method of claim 7, wherein said repetitive synchronization portion is a VCO synchronization field.

9. The method of claim 2, further comprising the step of synchronizing said input signal and said reference signal by utilizing a leading edge of a user-defined signal indicative of corresponding portions of each of said signals.

10. The method of claim 9, wherein said leading edge of said user-defined signal is a read enable signal switching states, thereby indicating that processing of the input or reference signal associated therewith may begin.

11. The method of claim 1, further comprising the steps of:
receiving a reference signal;
analyzing said input signal utilizing a Viterbi detector and generating a confidence factor at at least one sample point indicative of the ease with which said Viterbi detector is able to select between alternative results for a portion of said input signal at each sample point;
analyzing said reference signal utilizing said Viterbi detector and generating a confidence factor at at least one corresponding sample point indicative of the ease with which said Viterbi detector is able to select between alternative results for a portion of said reference signal at each corresponding sample point;
comparing results of the Viterbi analysis and confidence factor of said input signal at each sample point with results of the Viterbi analysis and confidence factor of said reference signal at each corresponding sample point; and
determining the location of errors within said input signal by determining where the confidence factor of selecting between alternative results within the Viterbi analysis of said input signal at a particular sample point differs from the confidence factor of selecting between alternative results within the Viterbi analysis of said reference signal at a corresponding sample point.

12. The method of claim 11, further comprising the step of determining an input Sequence Amplitude Margin (SAM) as an average of said confidence factors for said input signal.

13. The method of claim 11, wherein said reference signal is input on a channel different from a channel which said input signal is input.

14. The method of claim 12, further comprising the step of retrieving said reference signal from a memory location.

15. The method of claim 11, further comprising the step of displaying a position corresponding the location of said determined error.

16. The method of claim 15, wherein said position is indicated as a byte offset from a first byte of data of a portion of said input signal.

17. The method of claim 11, further comprising the step of synchronizing said input signal and said reference signal utilizing a repetitive synchronization portion of each of said signals.

18. The method of claim 17, wherein said repetitive synchronization portion is a VCO synchronization field.

19. The method of claim 11, further comprising the step of synchronizing said input signal and said reference signal by utilizing a leading edge of a user-defined signal indicative of corresponding portions of each of said signals.

20. The method of claim 19, wherein said leading edge of said user-defined signal is a read enable signal switching states, thereby indicating that processing of the input or reference signal associated therewith may begin.

21. The method of claim 11, wherein the results of said Viterbi analysis of said input signal and said reference signal are digital in format.

22. The method of claim 1, further comprising the steps of:
analyzing said input signal utilizing a Viterbi detector by generating a Viterbi channel emulation of said input signal; and
determining the location of errors within said input signal by determining where a confidence factor at at least one sample point indicative of the ease with which said Viterbi detector is able to select between alternative results at each sample point within the Viterbi analysis of said input signal is less than a predetermined threshold.

23. The method of claim 22, further comprising the step of determining a Sequence Amplitude Margin (SAM) as an average of said confidence factors.

24. The method of claim 22, further comprising the step of displaying said errors having the lowest confidence factor.

25. The method of claim 22, wherein said Viterbi channel emulation is generated based upon a selected Partial Response Maximum Likelihood (PRML) format.

26. The method of claim 1, wherein said input signal is a Non Return to Zero (NRZ) output from a disk drive, said method further comprising the steps of:
storing said input signal as an NRZ reference signal;
retrieving a subsequent NRZ output signal from said disk drive as a subsequent NRZ input signal;
analyzing said retrieved NRZ output signal;
comparing analyzation results of said stored NRZ reference signal with analyzation results of said subsequent NRZ input signal;
determining the location of errors within said subsequent NRZ input signal by determining where said analyzation results of said stored NRZ reference signal differs from said analyzation results of said subsequent NRZ input signal; and
displaying an analog signal corresponding to the location of errors in said subsequent NRZ input signal.

27. The method of claim 1, further comprising the step of analyizing less than all of said input signal to determine if any errors exist.

28. The method of claim 27, further comprising the step of designating a predetermined amount of data not to be analyzed at the beginning of a portion of said input signal.

29. The method of claim 27, further comprising the step of designating a predetermined amount of data not to be analyzed at the end of a portion of said input signal.

30. The method of claim 27, further comprising the step of designating an identification portion of said input signal which is not analyzed.

31. The method of claim 1, further comprising the step of displaying a position corresponding to the displayed portion of said input signal determined to have an error.

32. The method of claim 31, wherein said position is indicated as a byte offset from a first byte of data of a portion of said input signal.

33. The method of claim 1, further comprising the steps of:

storing the location of each of said portions of said input signal determined to have an error;

ordering said stored locations in decreasing order of severity of the determined error; and consecutively displaying said portions of said input signal including said errors in decreasing order.

34. The method of claim 1, further comprising the steps of:

storing the location of each of said portions of said input signal determined to have an error in the order in which said error was encountered; and consecutively displaying said portions of said input signal including said errors in the order in which said errors were encountered.

35. A method of analyzing a signal received from a recording medium, comprising the steps of:

receiving an input signal from said recording medium;

selecting an analysis technique;

determining a portion of said input signal likely to show an error; and automatically displaying said input signal corresponding to a portion thereof determined to be likely to show an error.

36. The method of claim 35, wherein said analysis technique is selected from the group consisting of comparing said input signal with a reference signal, comparing a confidence factor indicative of the ease with which a Viterbi detector is able to select between alternate results for a portion of said input signal with a confidence factor indicative of the ease with which a Viterbi detector is able to select between alternate results of a portion of a reference signal, comparing the confidence factor indicative of the ease with which a Viterbi detector is able to select between alternate results of a portion of said input signal with a predetermined threshold, and comparing a Non Return to Zero (NRZ) component of said input signal with a stored NRZ signal.

37. The method of claim 36, further comprising the step of displaying a position of each displayed error.

38. The method of claim 37, wherein said portion is indicated as a byte offset from a first byte of data of a portion of said input signal.

39. An apparatus for analyzing a signal received from a recording medium, comprising:

receiving means for receiving an input signal from said recording medium;

determining means for determining a portion of said input signal likely to show an error; and display means for automatically displaying said input signal adjacent the portion thereof determined to be likely to show an error.

40. The apparatus of claim 39, wherein said input signal is an analog signal from a disk drive.

41. The apparatus of claim 39, further comprising:

means for receiving a reference signal;

means for analyzing said reference signal; and a comparator for comparing analysis results of said input signal with analysis results of said reference signal;

wherein said determining means determines the location of errors within said input signal by determining where said analysis results of said input signal differs from said analysis results of said reference signal by more than a predetermined threshold amount.

42. The apparatus of claim 41, further comprising:

a first channel for receiving said reference signal; and a second channel different from said first channel for receiving said input signal.

43. The apparatus of claim 41, further comprising a memory for storing said reference signal.

44. The apparatus of claim 41, further comprising a display for displaying a position corresponding to the location of said error determined by said determining means.

45. The apparatus of claim 44, wherein said position is indicated as a byte offset from a first byte of data of a portion of said input signal.

46. The apparatus of claim 41, further comprising a synchronizer for synchronizing said input signal and said reference signal utilizing a repetitive synchronization portion of said signals.

47. The apparatus of claim 46, wherein said repetitive synchronization portion is a VCO synchronization field.

48. The apparatus of claim 41, further comprising a synchronizer for synchronizing said input signal and said reference signal utilizing a leading edge of a user defined signal indicative of corresponding portions of each of said signals.

49. The apparatus of claim 48, wherein said leading edge of said user-defined signal is a read enable signal switching states, thereby indicating that processing of the input or reference signal associated therewith may begin.

50. The apparatus of claim 39, further comprising:

means for receiving a reference signal;

a Viterbi detector, said Viterbi detector being adapted to analyze said input signal and said reference signal to generate a confidence factor at at least one sample point indicating the ease with which said Viterbi detector is able to select between alternative results for a portion of said input signal at each sample point and a confidence factor at at least one corresponding sample point indicating the ease with which said Viterbi detector is able to select between alternative results for a portion of said reference signal at each corresponding sample point; and a comparator for comparing results of the Viterbi analysis and confidence factor of said input signal at each sample point with results of the Viterbi analysis and confidence factor of said reference signal at each corresponding sample point;

wherein said determining means determines the location of errors within said input signal by determining where the confidence factor of selecting between alternative results within the Viterbi analysis of said input signal at a particular sample point differs from the confidence factor of selecting between alternative results within the Viterbi analysis of said reference signal at a corresponding sample point.

51. The apparatus of claim 50, further comprising a Sequence Amplitude Margin (SAM) determining means for determining a SAM as an average of said confidence factors for said input signal.

52. The apparatus of claim 50, further comprising:

a first channel for receiving said reference signal; and a second channel different from said first channel for receiving said input signal.

53. The apparatus of claim 50, further comprising a memory for storing said reference signal.

54. The apparatus of claim 50, further comprising a display for displaying a position corresponding to the location of said error determined by said determining means.

55. The apparatus of claim 54, wherein said position is indicated as a byte offset from a first byte of data of a portion of said input signal.

56. The apparatus of claim 50, further comprising a synchronizer for synchronizing said input signal and said reference utilizing a repetitive synchronization portion of each of said signals.

57. The apparatus of claim 56, wherein said repetitive synchronization portion is a VCO synchronization field.

58. The apparatus of claim 50, further comprising a synchronizer for synchronizing said input signal and said reference signal utilizing a leading edge of a user-defined signal indicative of corresponding portions of each of said signals.

59. The apparatus of claim 58, wherein said leading edge of said user-defined signal is a read enable signal switching states, thereby indicating that processing of the input or reference signal associated therewith may begin.

60. The apparatus of claim 50, wherein the results of said Viterbi analysis of said reference signal and said input signal are digital in format.

61. The apparatus of claim 39, further comprising:
   a Viterbi generator for generating a Viterbi channel emulation of said input signal; and
   a Viterbi detector for analyzing said input signal;
   wherein said determining means determines the location of errors within said input signal by determining where a confidence factor at at least one sample point indicative of the ease with which said Viterbi detector is able to select between alterative results at each sample point within the Viterbi analysis of said input signal is less than a predetermined threshold.

62. The apparatus of claim 61, further comprising a Sequence Amplitude Margin (SAM) determining means for determining a SAM as an average of said confidence factors for said input signal.

63. The apparatus of claim 61, wherein said display means displays said errors having the lowest confidence factor.

64. The apparatus of claim 61, wherein said Viterbi channel emulation is generated based upon a selected Partial Response Maximum Likelihood (PRML) format.

65. The apparatus of claim 39, further comprising:
   a Non Return to Zero (NRZ) probe for receiving a first and a subsequent NRZ signal from a disk drive, said first NRZ signal comprising an NRZ reference signal, said subsequent NRZ signal comprising an NRZ input signal;
   a memory for storing said first NRZ signal as an NRZ reference signal; and
   means for analyzing said stored NRZ reference signal and said subsequent NRZ signal;
   a comparator for comparing analysis results of said stored NRZ reference signal with analysis results of said subsequent NRZ input signal;
   said determining means determining the location of errors within said subsequent NRZ input signal by determining where said analysis results of said stored NRZ reference input signal differs from said analysis results of said subsequent NRZ input signal, and said display means displaying an analog signal corresponding to the location of errors in said subsequent NRZ input signal.

66. The apparatus of claim 39, wherein less than all of said signal is analyzed to determine if any errors exist.

67. The apparatus of claim 66, wherein a predetermined amount of data is designated as not being analyzed at the beginning of a portion of said input signal.

68. The apparatus of claim 66, wherein a predetermined amount of data is designated as not being analyzed at the end of a portion of said input signal.

69. The apparatus of claim 66, wherein a predetermined identification portion of said input signal is designated as not being analyzed.

70. The apparatus of claim 39, further comprising:
   a byte offset location display for displaying a position corresponding to the portion of said input signal displayed by said displaying means, said position being indicated as a byte offset from a first byte of data of a portion of said input signal.

71. The apparatus of claim 39, further comprising:
   a memory for storing the location of each of said portions of said input signal determined to have an error; and
   ordering means for ordering said stored locations in decreasing order of severity of the determined error;
   wherein said display means displays portions of said input signal including said errors in decreasing order.

72. The apparatus of claim 39, further comprising:
   a memory for storing the location of each of said portions of said input signal determined to have an error in the order in which the error was encountered; and
   wherein said display means displays portions of said input signal including said errors in the order in which said errors were encountered.

73. An apparatus for analyzing a signal received from a recording medium, comprising:
   receiving means for receiving an input signal from said recording medium;
   an analyzer for analyzing said input signal, said analyzer utilizing one of a plurality of analysis techniques;
   a determiner for determining a portion of said input signal likely to show an error; and
   displaying means for automatically displaying said input signal corresponding to a portion thereof determined to be likely to show an error.

74. The apparatus of claim 73, wherein said analysis technique is selected from the group consisting of comparing said input signal with a reference signal, comparing a confidence factor indicative of the ease with which a Viterbi detector is able to select between alternate results for a portion of said input signal with a confidence factor indicative of the ease with which a Viterbi detector is able to select between alternate results of a portion of a reference signal, comparing the confidence factor indicative of the ease with which a Viterbi detector is able to select between alternate results of a portion of said input signal with a predetermined threshold, and comparing a Non Return to Zero (NRZ) component of said input signal with a stored NRZ signal.

75. The apparatus of claim 74, wherein said display means displays a position of each displayed error.

76. The apparatus of claim 75, wherein said portion is indicated as a byte offset from a first byte of data of a portion of said input signal.

* * * * *

UNITED STATES PATENT AND TRADEMARK OFFICE
CERTIFICATE OF CORRECTION

PATENT NO. : 6,442,730 B1
DATED : August 27, 2002
INVENTOR(S) : Joseph M. Schachner et al.

It is certified that error appears in the above-identified patent and that said Letters Patent is hereby corrected as shown below:

<u>Column 26,</u>
Line 51, change "analyizing" to -- analyzing --.

Signed and Sealed this

Seventh Day of January, 2003

JAMES E. ROGAN
*Director of the United States Patent and Trademark Office*